US005595257A

United States Patent [19]
Yoshida et al.

[11] Patent Number: 5,595,257
[45] Date of Patent: Jan. 21, 1997

[54] CONTROL APPARATUS FOR A VEHICLE

[75] Inventors: Susumu Yoshida; Takeshi Nakazawa, both of Saitama, Japan

[73] Assignee: Honda Giken Kogyo Kabushiki Kaisha, Tokyo, Japan

[21] Appl. No.: 174,006

[22] Filed: Dec. 28, 1993

[30] Foreign Application Priority Data

Dec. 28, 1992 [JP] Japan ................................. 4-348256
Oct. 8, 1993 [JP] Japan ................................. 5-253421

[51] Int. Cl.[6] ............................................... B60R 25/00
[52] U.S. Cl. ................. 180/287; 307/10.2; 307/10.5; 340/825.31
[58] Field of Search ........................ 180/287; 307/10.2, 307/10.3, 10.4, 10.5, 9.1; 340/825.31, 825.34; 70/254, 255

[56] References Cited

U.S. PATENT DOCUMENTS

| | | | |
|---|---|---|---|
| 4,866,433 | 9/1989 | Akatsu | 307/10.2 X |
| 4,982,072 | 1/1991 | Takigami | 307/10.4 X |
| 5,079,435 | 1/1992 | Tanaka | 307/10.2 |
| 5,136,284 | 8/1992 | Kitamura | 307/10.5 X |
| 5,229,648 | 7/1993 | Sues et al. | 307/10.2 |
| 5,343,077 | 8/1994 | Yoshida et al. | 180/287 X |
| 5,412,378 | 5/1995 | Clemens | 180/287 X |

FOREIGN PATENT DOCUMENTS

| | | |
|---|---|---|
| 0373320 | 10/1991 | European Pat. Off. . |
| 0519205 | 12/1992 | European Pat. Off. . |
| 0334672 | 1/1995 | European Pat. Off. . |
| 641466 | 4/1922 | France . |
| 2647070 | 11/1990 | France . |
| 2901429 | 7/1979 | Germany ................................. 180/287 |
| 3-121953 | 5/1991 | Japan . |
| 657329 | 8/1986 | Switzerland . |
| 2252847 | 8/1992 | United Kingdom . |
| 8808381 | 11/1988 | WIPO ................................. 180/287 |
| WO91/13226 | 9/1991 | WIPO . |

Primary Examiner—Christopher P. Ellis

[57] ABSTRACT

To provide a control apparatus for a vehicle capable of performing the biasing, releasing, locking, and unlocking of an engine in the sequential action. A flat key is inserted in an opening portion of a casing constituting a controller. When the key is judged to be correct with respect to the vehicle, a current is allowed to flow in a solenoid, a solenoid plunger is actuated. As a result, a rachet plate is displaced, so that a first detector faces to a second detector. Thus, when an engine start switch is turned ON, a specified current is allowed to flow in a CPU of a controller. When the key is ejected from the casing, the engine is released, and the solenoid is turned OFF. At this time, by the turning of an operating lever, the first detector is separated from the second detector. By further turning of the operating lever a locked state of the handle occurs.

35 Claims, 33 Drawing Sheets

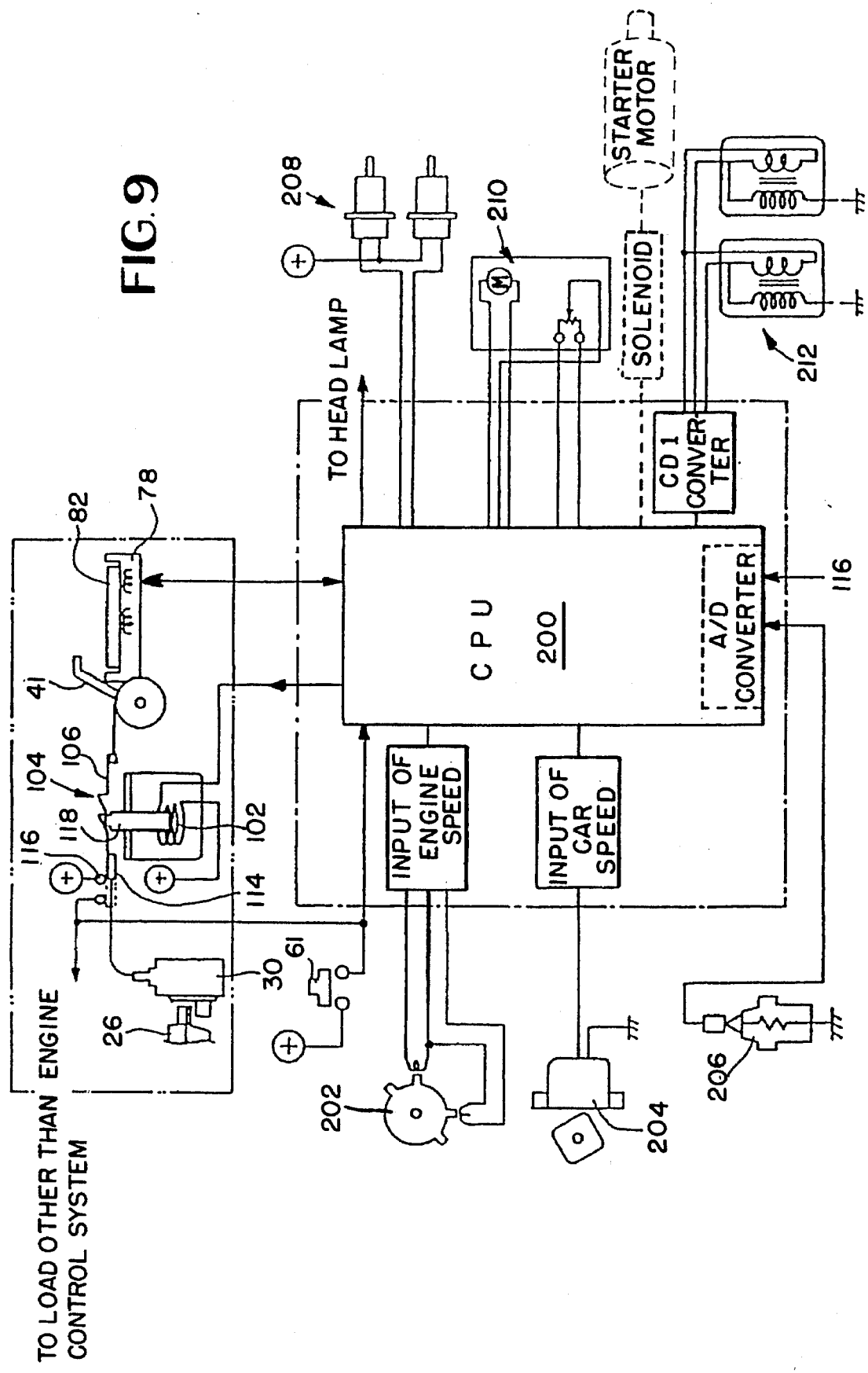

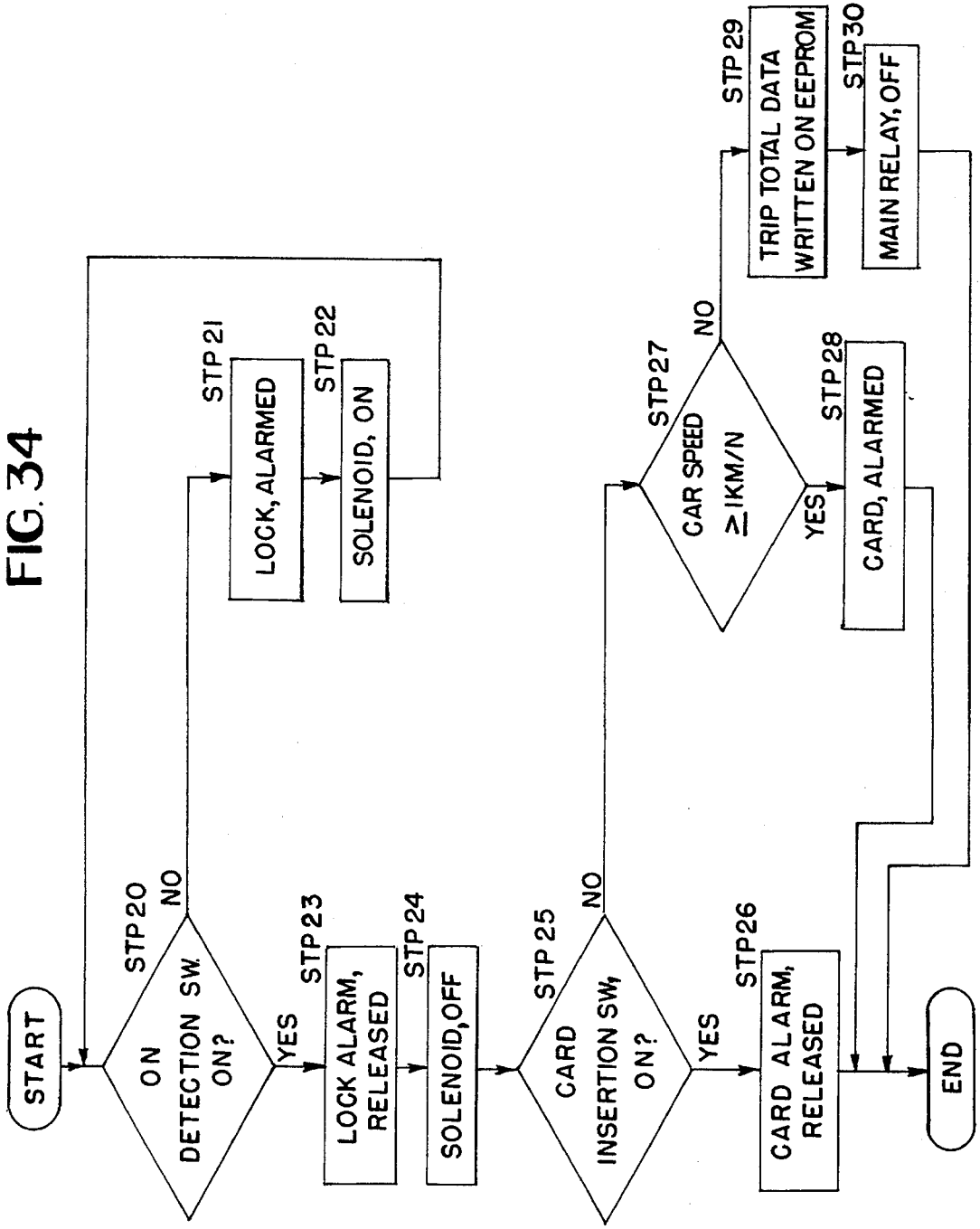

CONTROL APPARATUS FOR A VEHICLE

BACKGROUND OF THE INVENTION

1. Field of the Invention

The present invention relates to a control apparatus for a vehicle, and particularly to a control apparatus for a vehicle for starting and stopping of an engine using a key and including a burglar preventive mechanism.

2. Description of Background Art

For example, as disclosed in Japanese Patent Laid Open No. HEI 3-121953, in a motorcycle, an engine key is used for starting and the stopping of an engine. The engine key has a mechanical structure for activating the cylinder lock. In particular, in a motorcycle, the structure for starting and stopping of an engine by an engine key is exposed to the outside. Accordingly, for example, the engine may be started without a key by forcibly connecting a lead wire to the starter for the engine. To cope with the above disadvantage, there has been adopted a special preventive structure for preventing the lead wire for a starter from being touched from the outside. In this structure, however, there occurs an inconvenience in increasing the weight and the manufacturing cost of the motorcycle.

SUMMARY OF THE INVENTION

The present invention provides a control apparatus for a vehicle capable of effectively preventing the starting of an engine without a key from the outside, without complicating the structure and increasing the manufacturing cost.

To achieve the above object, according to the present invention, there is provided a control apparatus for a vehicle including an engine control unit provided on a body frame for incorporating an electric circuit for starting and stopping an engine and a key used for controlling the operation of the engine in cooperation with the engine control unit. The engine control unit has an opening portion through which said key is inserted.

The engine control unit, preferably, has a judgement unit for judging whether or not said key inserted in said opening portion is correct with respect to said engine.

The engine control unit, preferably, includes a handle lock unit for locking/releasing a handle when the key inserted in the opening portion of the engine control unit is judged to be correct by the judgement unit.

Preferably, the key has a flat-shaped main body. A different key member is releasably inserted in the main body and is used for locking parts of the vehicle other than the operational control for the engine.

The handle lock unit, preferably, includes an operating member, and a handle rotation restricting member which is operated accompanied with the operation of the operating member.

Preferably, the key includes an IC card, and when the key is inserted in said opening portion, a recital signal stored in the IC card is supplied to the engine control unit; the judging unit judges whether or not the key is correct with respect to the engine based on the recital signal under the operation of the engine switch. When the key is judged to be correct, the engine is in the operational state.

The handle rotation restricting member, preferably, has a rachet mechanism which is interlocked with the operating member for releasing the rachet when the engine is in the operational state.

The handle rotation restricting member, preferably, includes a turning member which is rotated in one direction while being interlocked with the operating member for freely moving said handle rotation restricting member from a handle fixture releasing position to a handle fixing position. A drive means is provided for rotating the turning member in the other direction.

The operating member, preferably, can be disposed in a first position where the operation of the engine is possible, a second position where the operation of the engine is impossible, and a third position, a locked position, where the turning of the handle is prevented.

Preferably, the operating member prevents the ejection of the key from said opening portion at the first position, and permits the ejection of the key when the operating member is shifted from said second position to the third position.

The handle rotation restricting member is, preferably, engaged with a shaft portion of the handle for restricting the rotation of the handle by shifting of the operating member from the second position to the third position.

In a control apparatus for a vehicle according to the present invention, since a key is inserted in an opening portion provided on an engine control unit, a lead wire for starting an engine is not exposed to the outside. This makes it possible to prevent a theft without the provision of a special engine preventive mechanism.

In particular, a burglar can be prevented by a method wherein the key is inserted in the engine control unit and is judged whether or not the key is correct for the engine of the vehicle. Accordingly, even when the wiring portion and the like are modified, it is difficult to normally operate the engine control unit, and the vehicle cannot be substantially operated.

Further, the above key can be incorporated with a different key for releasing a tank cap and the like, which makes it possible to simplify the handling of the key.

Additionally, when an operating member is displaced from the second position to the third position, it permits the release of the key, while a handle rotation restricting member holds the handle in such a manner as not to be rotated. Accordingly, in the case of a burglar, the operation of the vehicle cannot be substantially performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is an electric circuit diagram of a control system incorporated in the control apparatus for a vehicle;

FIGS. 15A, 15B and 15C are views illustrating the operation of the handle lock unit, wherein FIG. 15A shows the state of the ON position; FIG. 15B shows the state of the OFF position; and FIG. 15C shows the state of the lock position;

FIG. 34 is a flow chart for detecting the fallout of the handle lock and the key.

DETAILED DESCRIPTION OF THE PREFERRED EMBODIMENTS

Figure 1:
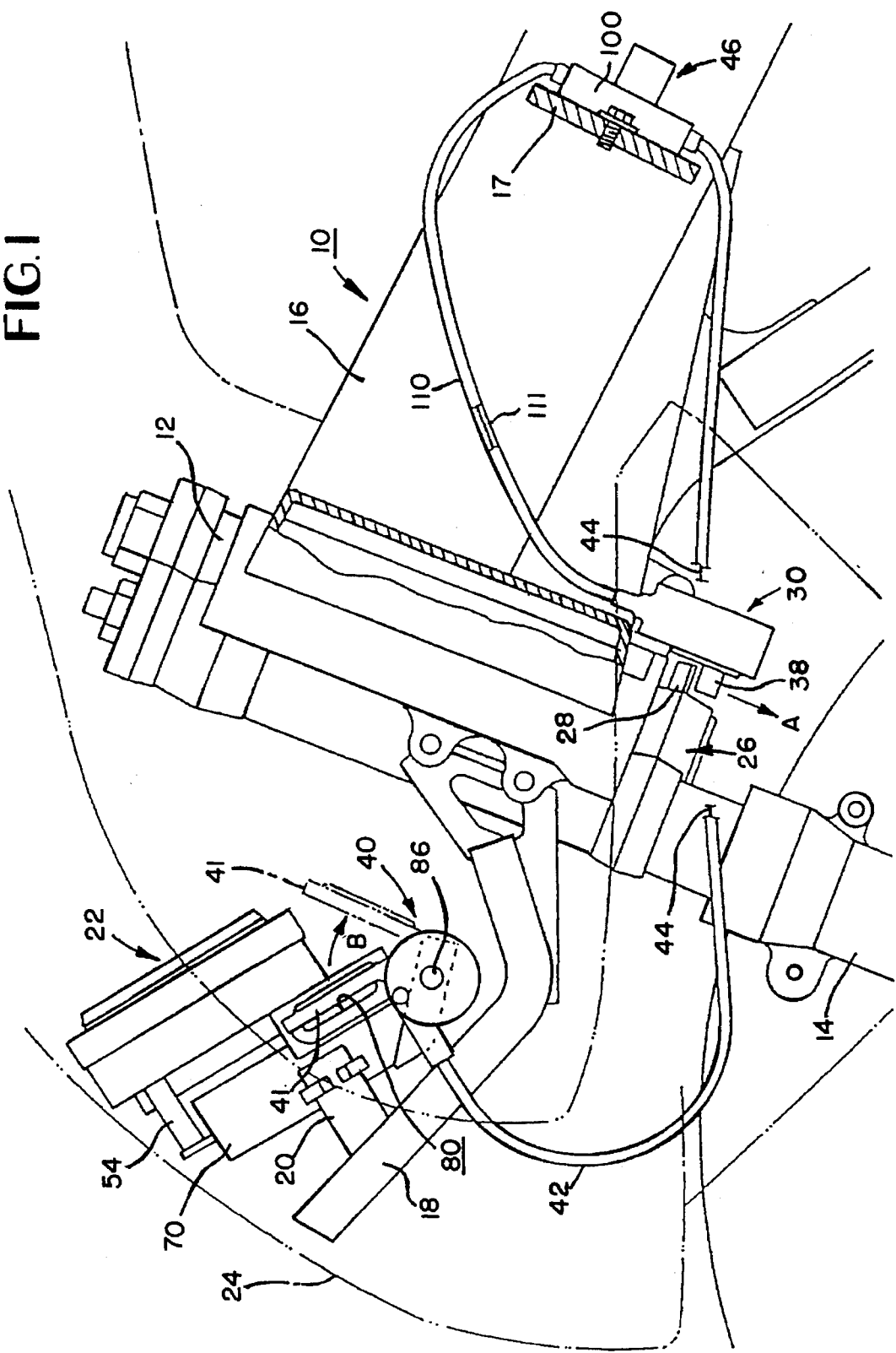
FIG. 1 is a side view illustrating the main parts of a motorcycle incorporated with a control apparatus for a vehicle according to a first embodiment of the present invention.

A control apparatus for a vehicle according to the present invention will be described in detail by way of embodiments with reference to the drawings. FIG. 1 is a schematic view showing part of a motorcycle 10 incorporated with a control apparatus for a vehicle according to a first embodiment. The motorcycle 10 includes a head pipe 12, front forks 14 and a main frame 16 for rotatably supporting the front forks 14. The main frame 16 is, while being not shown, branched into two parts from the head pipe 12, and a cross member 17 is provided to cross between the branch portions. A stay 18 extends from the main frame 16 to the front portion of the vehicular body. A controller 22, which constitutes the control apparatus for a vehicle according to the first embodiment, is held on the stay 18 through a holding member 20. A fairing 24 is provided to cover the controller 22 and the front portion of the vehicle.

Figure 2:
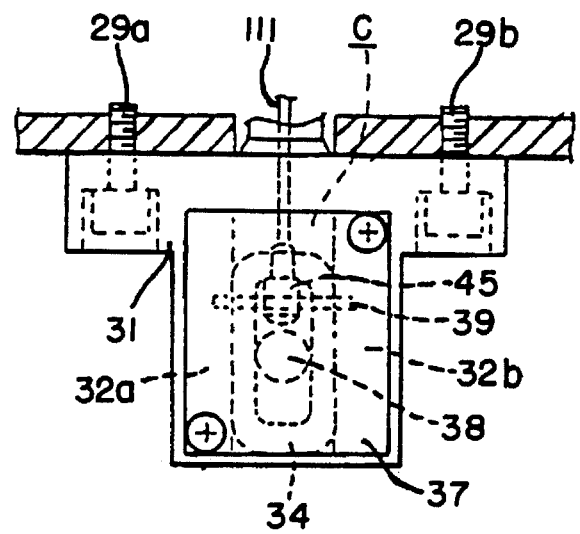
FIG. 2 is a plan view showing the appearance of a handle lock mechanism of the above control apparatus for a vehicle.
Figure 3:
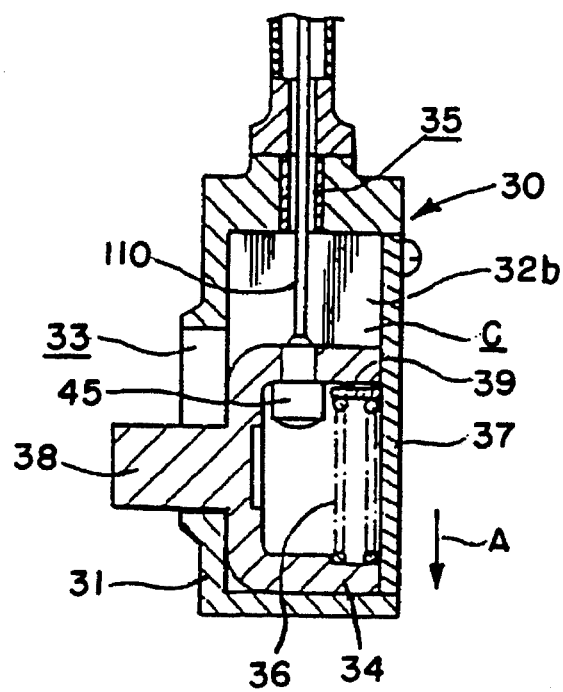
FIG. 3 is a vertical sectional view of the handle lock mechanism shown in FIG. 2.
Figure 4:
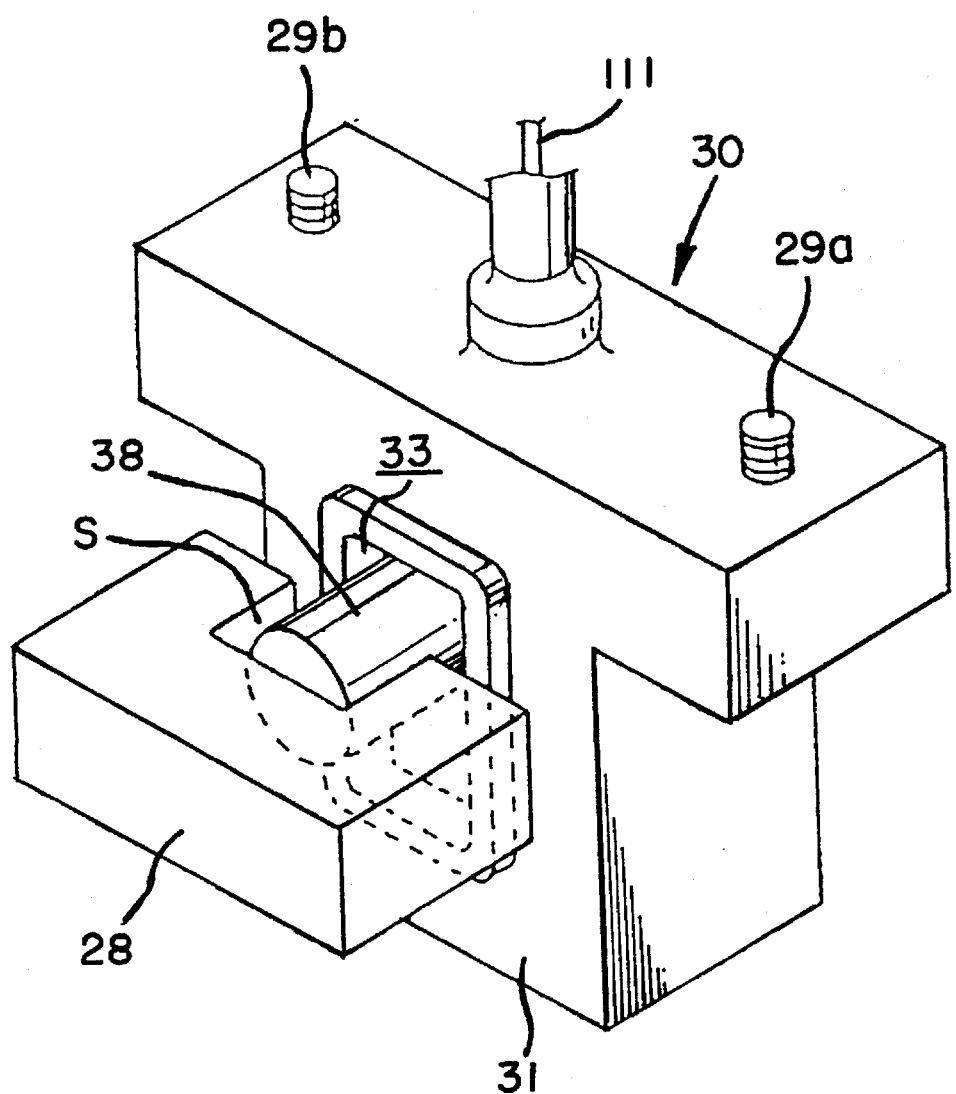
FIG. 4 is a perspective view illustrating the main parts of the handle lock mechanism shown in FIGS. 2 and 3.

A receiving portion 26 for the handle lock is provided on the lower portion of the main frame 16. As illustrated in FIG. 4, a claw member 28 formed in a U-shape in a plan view is provided so as to project from the receiving portion 26. On the other hand, as illustrated in FIG. 2, a handle lock main body 30 is fixed on the lower portion of the main frame 16 by bolts 29a and 29b. The handle lock main body 30 includes a housing body 31 having parallel guides 32a and 32b on both of the side portions. As shown in FIG. 3, in the housing body 31, an opening portion 33 is defined on the side surface; and a guide hole 35 is defined on the upper portion. A chamber C within the housing body 31 is blocked by a cover member 37. In addition, a locking member 39 is provided on the cover member 37 so as to project within the chamber C. As shown in FIG. 2, a sliding member 34 is provided between the guides 32a and 32b. A coil spring 36, which is fitted at one end portion thereof on the locking member 39, is seated on the bottom portion of the sliding member 34, so that the bottom portion of the sliding member 34 is biased in the direction of the arrow A under the spring force of the coil spring 36. The sliding member 34 has a pin portion (handle rotation restricting member) 38. The pin portion 38 passes through the opening portion 33 and projects to the claw member 28 side. When the sliding member 34 is moved in the direction opposed to the direction of the arrow A, the pin portion 38 is freely moved in a space S defined by the claw member 28, see FIG. 4. When the pin portion 38 remains within the space S, the handle lock is achieved, and a handle (not shown) cannot be turned.

A handle lock unit 40 for performing the above handle lock is provided on the controller 22 side. The handle lock unit 40 has a turnable operating lever (operating member) 41. The operating lever 41 is connected to one end portion of a cable 42. The cable 42 contains a wire 44 such that the wire 44 can be freely displaced. The wire 44 extending from the cable 42 is connected to a wire 111 contained in a cable 110 through a rachet mechanism described later. The wire 111 in the cable 110 is finally connected to the sliding member 34, and a connecting member 45 is provided on the leading edge of the wire 111. As shown in FIG. 3, the connecting member 45 is fixed on the upper portion of the sliding member 34. Accordingly, by turning of the operating lever 41, the wire 44 displaces the sliding member 34 through the wire 111, so that the pin portion 38 advances in the space S defined by the claw member 28.

Figure 5:
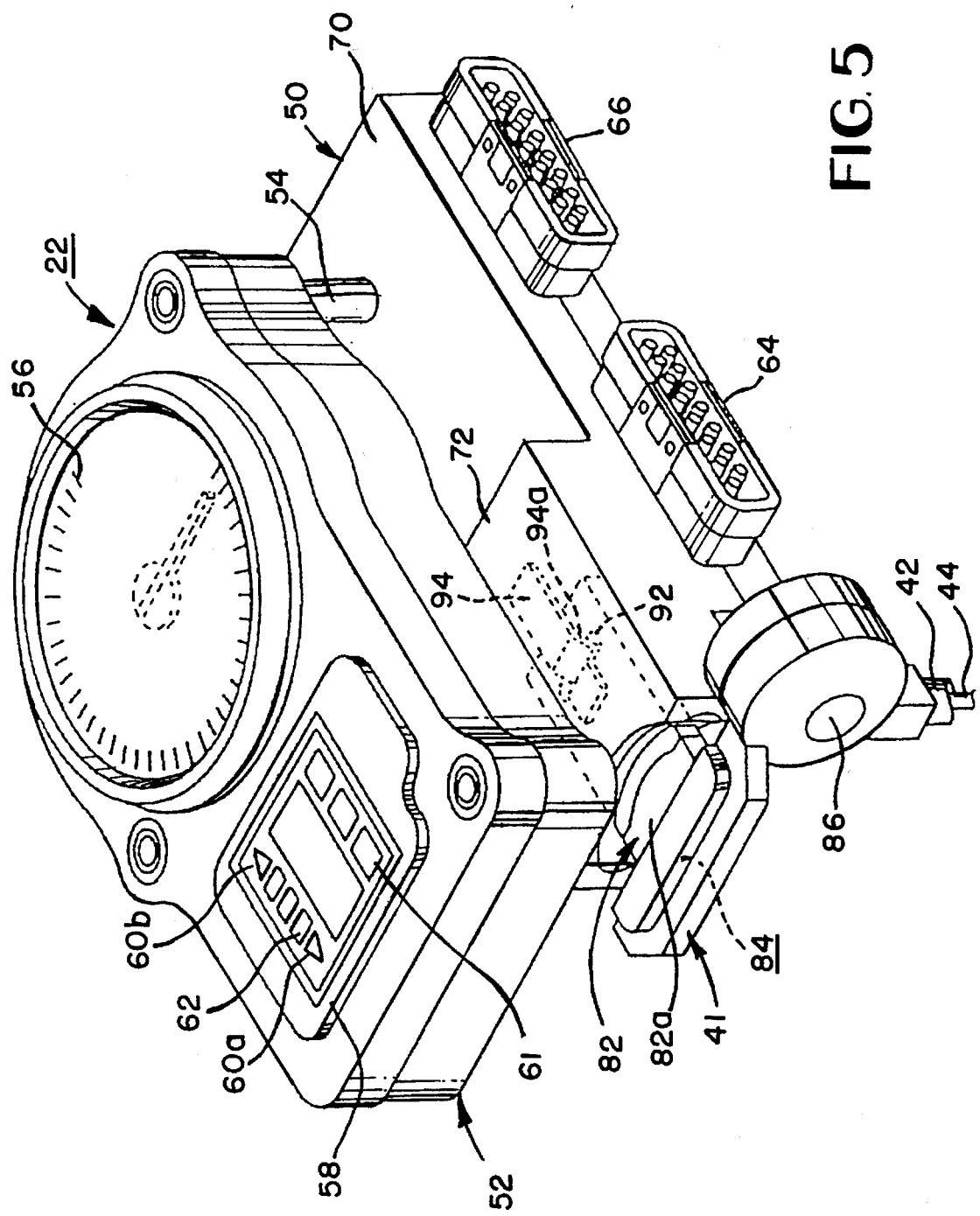
FIG. 5 is a perspective view illustrating a part of the control apparatus for a vehicle.

Next, the controller 22 will be described. As shown in FIG. 5, the controller 22 includes a controller main body 50 and a display set portion 52. The display set portion 52 is supported by a column 54 in such a manner as to extend upward from the controller main body 50. The display set portion 52 has a first indicator 56 for providing an analog-indication of speed, and a second indicator 58 for providing a digital-indication of speed. The second indicator 58 includes a direction indicator portions 60*a* and 60*b*, an engine start switch 61 and a set button 62. The controller main body 50 includes connectors 64 and 66, to which a power supply line, a signal line and the like to be connected to a battery are connected, not shown.

Figure 6:
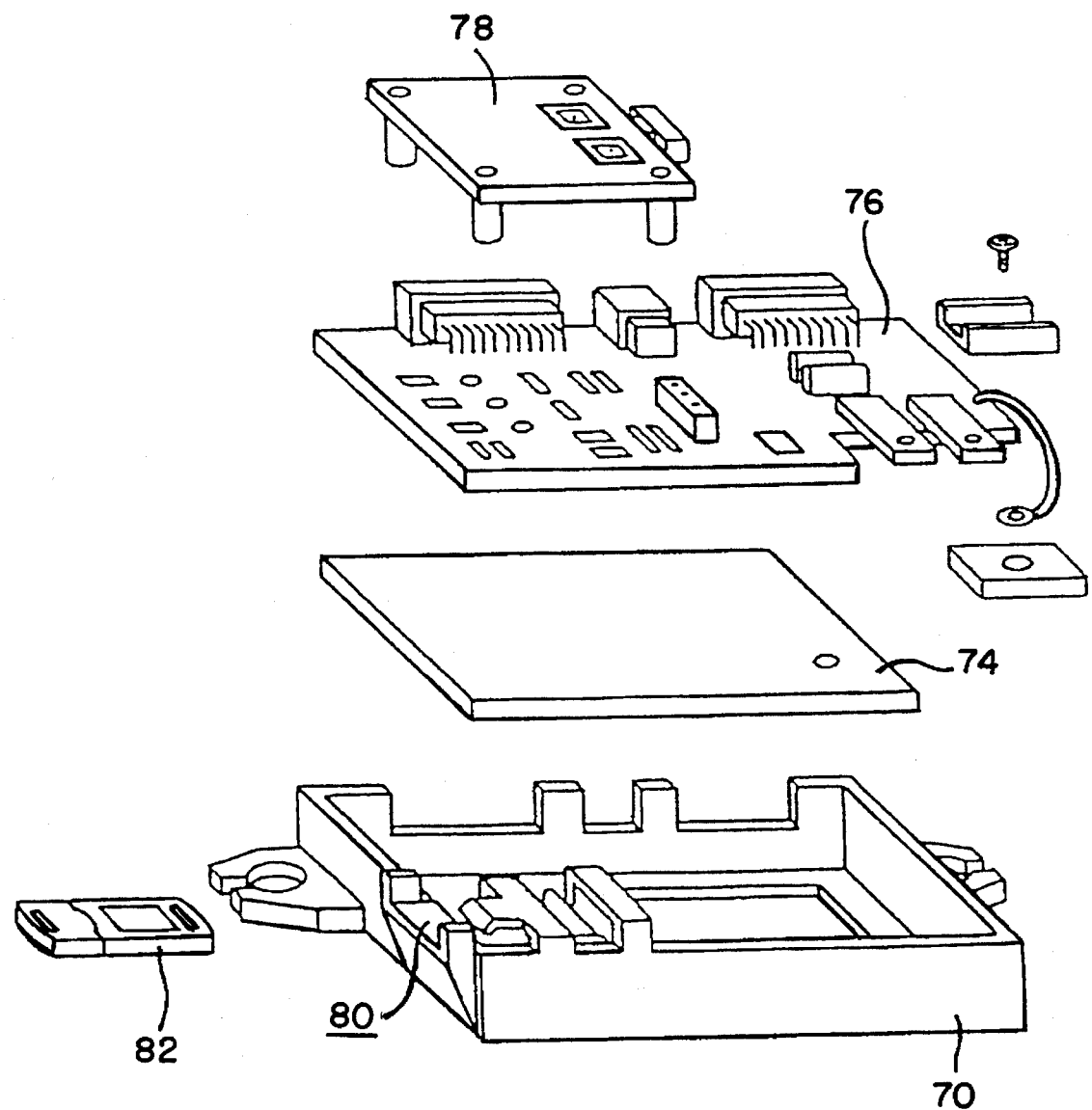
FIG. 6 is an exploded perspective view showing the inner structure of a controller of the control apparatus for a vehicle.

The controller main body 50 has a casing 70, as illustrated in FIGS. 1 and 5, for mounting and holding the connectors 64 and 66. An enlarged portion 72 is provided on one end side of the casing 70, which includes a heat radiation plate 74 formed of an aluminum plate, a substrate 76 with an electric circuit and a read-out substrate 78 contained in the enlarged portion 72, see FIG. 6. An open portion 80 is provided on one side portion of the casing 70, and a flat plate-like key 82 can be freely inserted in the open portion 80. When the key 82 inserted in the casing 70 through the opening portion 80, it faces to the lower surface of the read-out substrate 78 and the information contained in a non-contact IC card 89 can be read-out by the read-out substrate 78, see FIG. 7.

As is apparent from FIG. 1, the operating lever 41 is rotatably supported in proximity to the open portion 80 of the casing 70. The operating lever 41 has a circular-arc space 84 which surrounds a head portion 82*a* of the key 82 when the key 82 is inserted in the opening portion 80, see FIG. 5.

Figure 7:
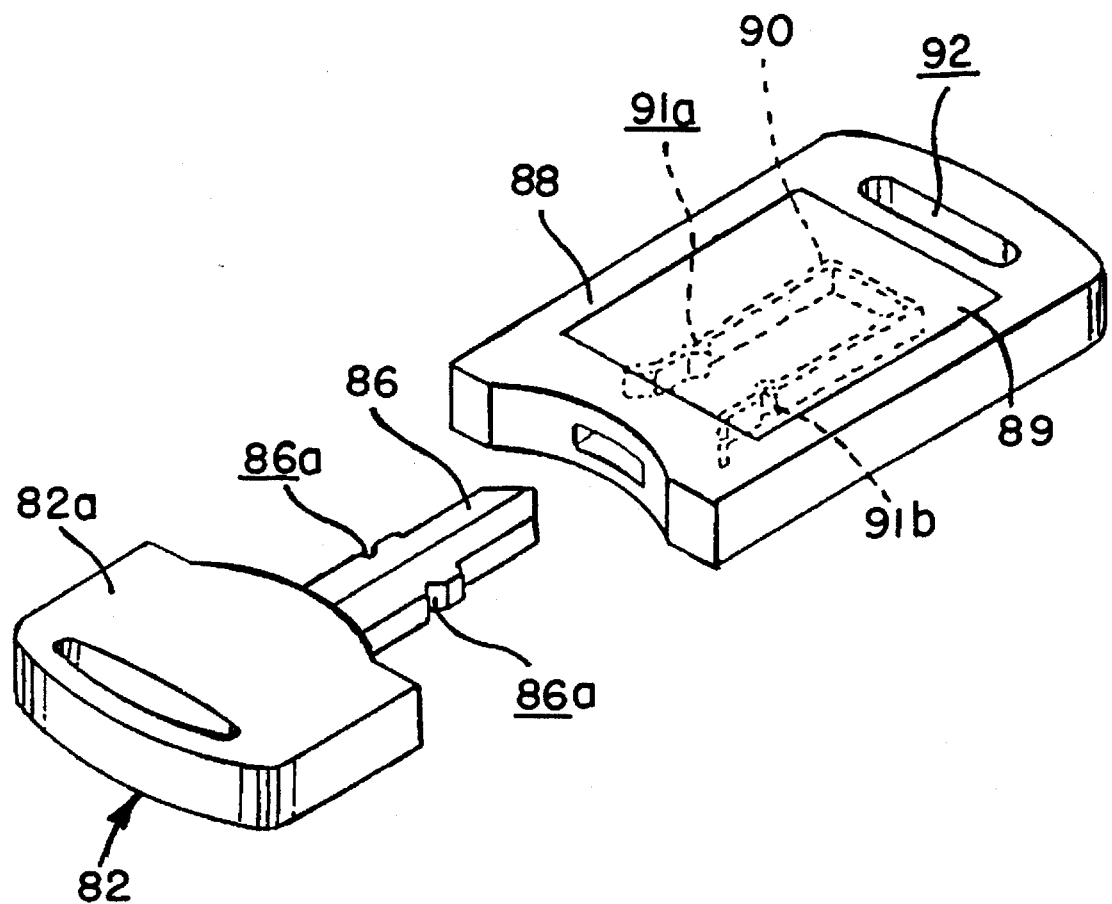
FIG. 7 is an exploded perspective view showing the structure of a key for the control apparatus for a vehicle.

Referring to FIG. 7, the key 82 includes a key member 86, and a flat case, main body, 88 for surrounding the key member 86 which is inserted therein. The case has the non-contact IC card 89 on the surface, and contains a first lock plate 90 for preventing the release of the key member 86. The first lock plate 90 includes projecting portions 91*a* and 91*b* which are formed of metal made bent flat plates and engaged with recessed portions 86*a* and 86*a* of the key member 86. A recessed portion 92 is defined at the leading edge of the case 88. When the key 82 is inserted in the open portion 80 of the controller main body 50, a projecting portion 94*a* of a second lock plate 94 is provided within the enlarged portion 72 and fitted in the recessed portion 92, see FIG. 5.

The rachet mechanism shown in FIG. 1 and FIGS. 8A to 8C is fixed on the cross member 17 hung by the main frame 16 by a bolt and nut. In the rachet mechanism, a solenoid 102 is provided on a housing 100 which is opened at its one side, and a rachet plate 104 is slidably provided in the longitudinal direction within the housing 100. A plurality of rachets 106 are provided on the rachet plate 104 along the longitudinal direction. One end portion of the wire 111 in the cable 110 extending from the handle lock side is engaged with a locking member 108 on one end portion side of the rachet plate 104, while the wire 44 extending from the operating lever 41 side is engaged with a locking member 112 on the other end portion side of the rachet plate 104. A first detector 114 is integrally provided at the intermediate portion of the rachet plate 104 displaced in the housing 100 in the longitudinal direction. The first detector 114 is capable of being contacted with and separated from a second detector 116 provided in the inner space of the housing 100. The output of the first detector 114 is introduced in a CPU 200 provided in the controller (described later) through the connector 64.

Figure 8A:
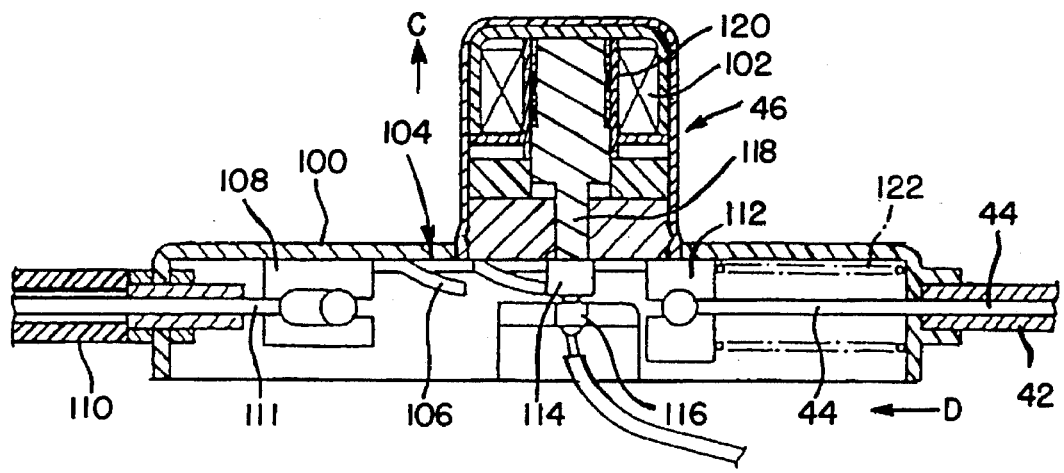
FIGS. 8A, 8B and 8C are views illustrating a lock unit incorporated with the control apparatus for a vehicle.
Figure 8B:
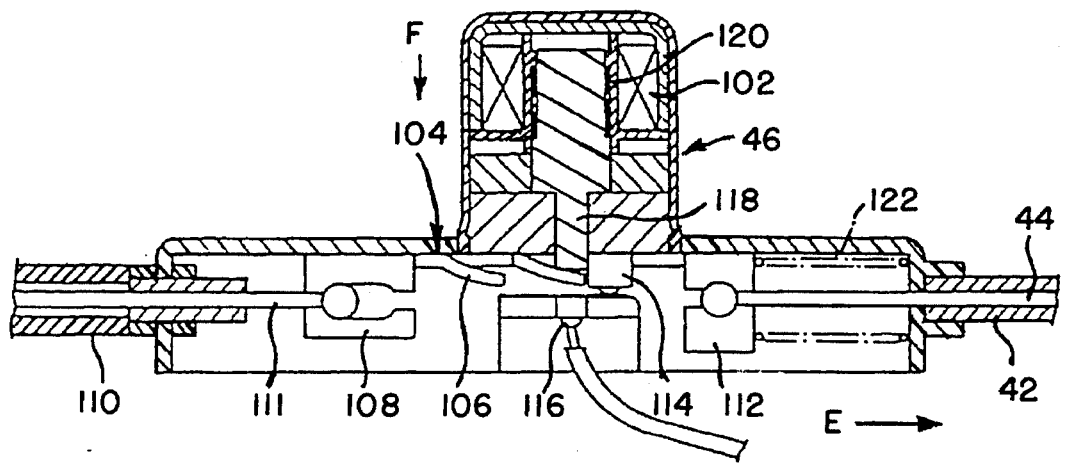
Figure 8C:
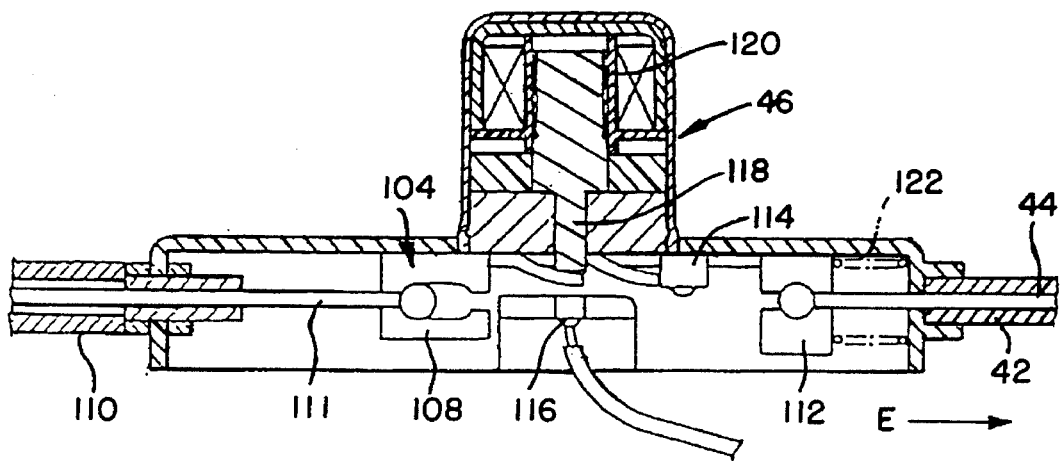

As is easily understood from FIGS. 8A to 8C, a solenoid plunger 118 of the solenoid 102 is disposed so as to be engageable with the rachet plate 104. In addition, reference numeral 120 indicates a coil spring for returning the solenoid plunger 118 to the original position. A coil spring 122 is provided in the housing 100 for pressing the locking member 112 by a spring force in the direction of the arrow D.

FIG. 9 shows an electric circuit diagram according to the above substrate 76 and the read-out substrate 78. The electric circuit diagram includes the CPU 200. The CPU 200 processes input signals from an engine speed sensor 202, a car speed sensor 204 and an engine temperature sensor 206; a biasing/releasing signal for the solenoid 208 to open/close a carburetor fuel/air bleed passage; a drive signal and its feedback signal for an exhauster servo-motor 210; and a biasing/releasing signal for an ignition coil 212. The CPU 200 further processes a signal read-out from the non-contact IC card 89 of the key 82 through the read-out substrate.

The control apparatus for a vehicle according to the first embodiment is so constructed as described above. Next, the function thereof will be described.

First, when the motorcycle is in the stopped state, particularly, in the state where the handle is in the full turning state, the pin portion 38 constituting the lock mechanism is engaged with the claw member 28 of the receiving portion 26 for handle lock which is fixed on the front forks 14. Accordingly, the handle cannot be turned.

In such a state, the handle is locked, so that a rachet plate 104 is moved in the direction of the arrow E in FIG. 8C, and the first detector 114 is separated from the second detector 116. Accordingly, the electric power is not supplied to the engine and the like.

As illustrated in FIG. 1, the operating lever 41 as the operating member is located at the position shown as the two-dot chain line, that is, a locked position (third portion), so that the opening portion 80 of the controller main body 50 constituting the controller 22 is open, and accordingly, the key 82 can be inserted in the open portion 80. At this time, as for the key 82, the key member 86 and the case 88 can be, of course, integrally inserted in the open portion 80. As a result, the projecting portion 94*a* of the second lock plate 94 is engaged with the recessed portion 92 of the key 82, to at first prevent the fallout of the key 82.

Next, an engine start switch 61 is pushed down, and electric power is supplied to the CPU 200. On the other hand, the case 88 of the key 82 includes the non-contact IC card. A recital cord and an engine setting data are previously stored in the non-contact IC card 89, and the information is read out by exposing the noncontact IC card 89 to the read-out substrate 78. The information thus read-out is taken in the CPU 200.

When the CPU 200 on the substrate 76 provided in the controller main body 50 judges that the correct key 82 is inserted, the lock state is released. Namely, as is apparent from FIGS. 8A to 8C, in the lock state, the solenoid plunger 118 is pushed down by the coil spring 120 to be engaged with the rachet 106, see FIG. 8C, and the first detector 114 is separated from the second detector 116. Here, as described above, when the CPU 200 determines that the correct key 82 is inserted in the controller 22, a current is allowed to flow from the power supply side (not shown) to the solenoid 102, so that the solenoid plunger 118 is retarded against the spring force of the coil spring 120 in the direction of the arrow C in FIG. 8A. As a result, the solenoid plunger 118 is removed from the rachet 106, and the rachet plate 104 is moved in the direction of the arrow D by the spring force of the coil spring 122. Namely, the lock position (third position) in FIG. 8C is shifted to the OFF position (second position) in FIG. 8B, and is further shifted to the ON position (first position) in FIG. 8A. The first detector 114 is thus contacted with the second detector 116. At this time, since the wire 111 is moved in the direction of the arrow D, the sliding member 34 in the handle lock main body 30 is displaced along the guides 32a and 32b by the spring force of the coil spring 36, so that the pin portion 38 is removed from the space S of the claw member 28. As a result, the handle lock is released, and also the operating lever 41 is rocked in the direction of the arrow B in FIG. 1, reaching the position shown by the solid line, that is, the first position, to prevent the fallout of the key 82.

At the same time, power from the battery (not shown) is supplied to parts other than the engine control system, for example a head lamp. Then, when the engine start switch 61 is pushed down again, the engine is started, and a load voltage is monitored to hold the regulator and the like in the ON state, thus obtaining the running state.

When the vehicle reaches the desired location and the engine is intended to be stopped, the operating lever 41 is manually turned to the second position between the positions shown by the solid line and the two-dot chain line in FIG. 1. Namely, there can be obtained such a state as shown in FIG. 8B, wherein the first detector 114 is separated from the second detector 116 and the power supply to parts other than the engine control system is stopped. Since the CPU 200 monitors the voltage, the regulator is turned OFF by the stopping of the power supply to stop the operation of the engine, and the power supply to the solenoid 102 is stopped. Accordingly, since the solenoid 102 is turned OFF, the solenoid plunger 118 is moved in the direction of the arrow F by the spring force of the coil spring 120 and the leading edge of the solenoid plunger 118 is engaged with the rachet 106. At this time, the key 82 is ejected.

The operating lever 41 is further turned up to the position shown by the two dot chain line in FIG. 1. Thus, there can be obtained such a state as shown in FIG. 8C. Namely, the wire is further pulled in the direction of the arrow E, and the wire 111 is also significantly pulled in the direction of the arrow E. As a result, when the handle is in the full turning state, the pin portion 38 advances in the space S defined by the claw member 28 of the receiving portion 26 for the handle lock by the displacement of the sliding member 34 against the coil spring 36, to thus ensure the lock state. At this time, the solenoid plunger 118 is actuated by the spring force of the coil spring 120, and the leading edge of the solenoid plunger 118 is engaged with the rachet 106 for preventing the release of the above locked state.

In this case, the key member 86 is used in such a state as to be integrated with the case 88. However, the key member 86 may be used for the other applications. For example, the key member 86 may be removed from the case 88 and disengaged from the projecting portions 91a and 91a of the first lock plate 90, to unlock a holder containing a helmet or a tank cap.

In FIG. 9, the solenoid and the starter motor are shown by a broken line. This discloses a second embodiment, wherein the solenoid is biased by pushing of the engine start switch 61, to drive the starter motor, thus starting the engine.

Next, a control apparatus for a vehicle according to a second embodiment of the present invention will be described with reference to the FIGS. 10 to 34.

Figure 10:
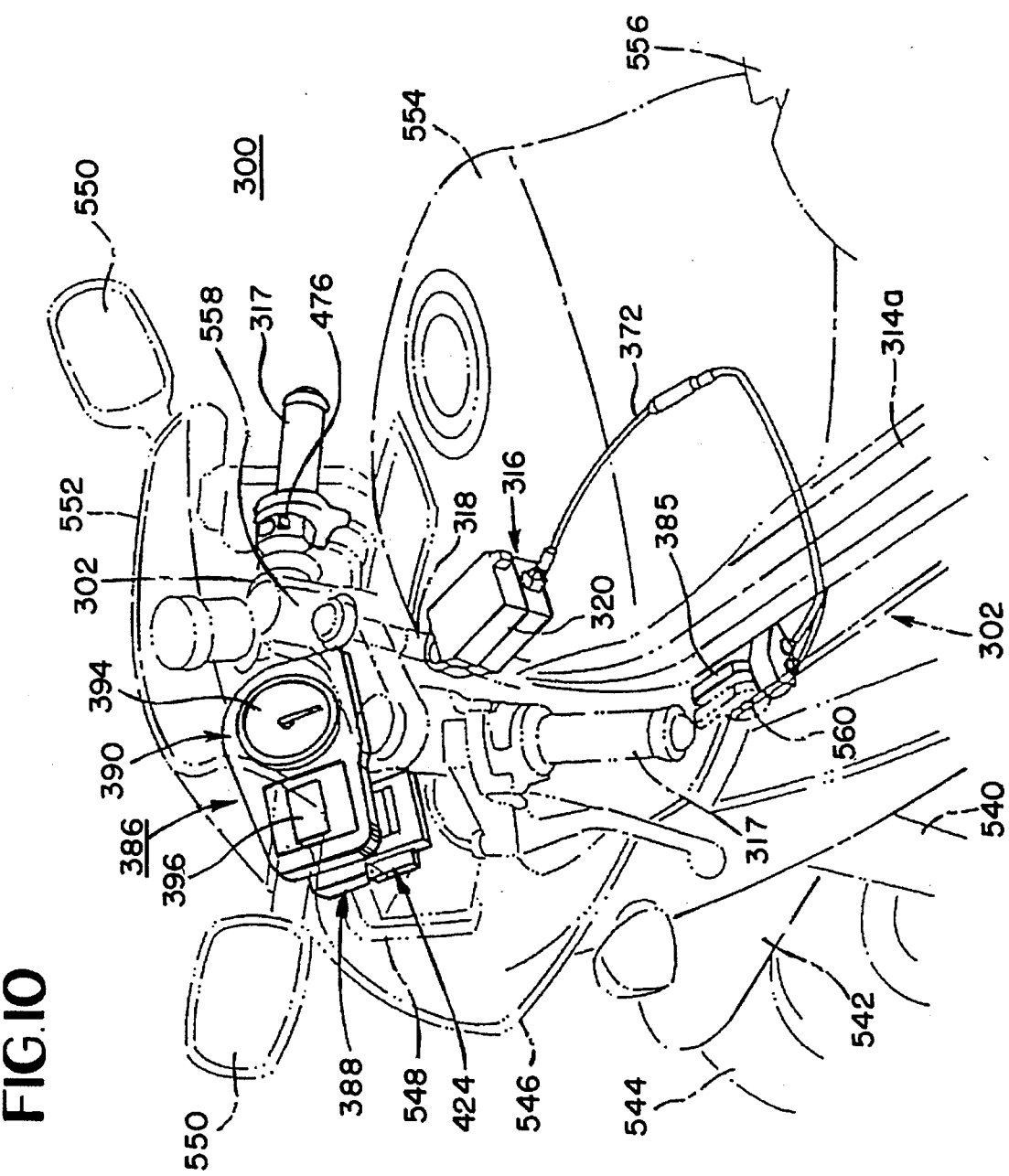
FIG. 10 is a perspective view of the main parts of a motorcycle incorporated with the control apparatus for a vehicle according to a second embodiment of the present invention.
Figure 11:
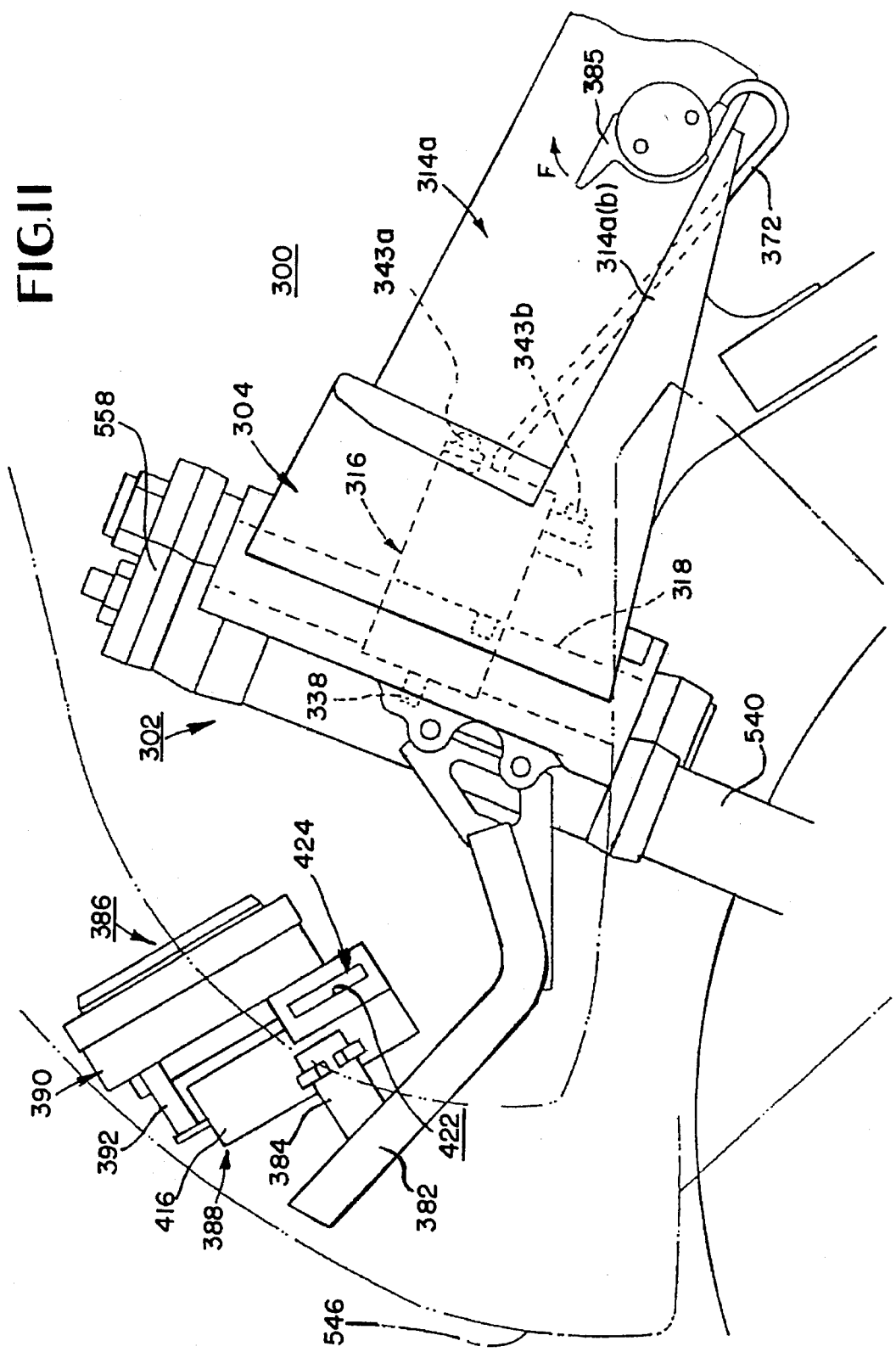
FIG. 11 is a side view illustrating the main parts of the motorcycle shown in FIG. 10.
Figure 12:
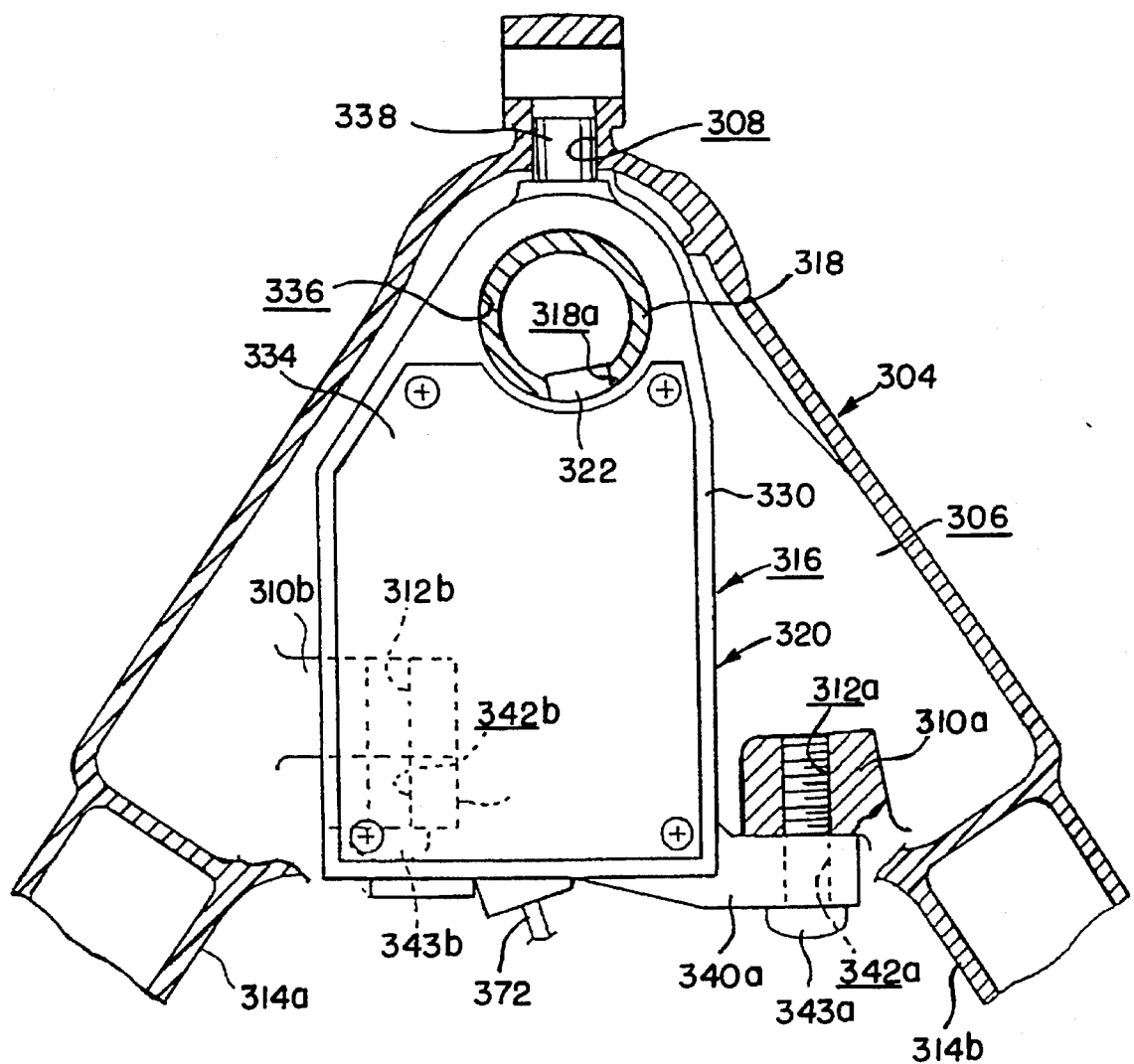
FIG. 12 is a plan view showing the state where a handle lock unit incorporated in the control apparatus for a vehicle to a head pipe portion, with parts partially cut-out.

FIGS. 10 and 11 show a portion of a motorcycle incorporated with a control apparatus for a vehicle according to the second embodiment. A motorcycle 300 includes a body frame 302. A head pipe portion 304 constituting the body frame 302 extends rearward on both sides, as shown in FIG. 12. A chamber 306 is formed in the head pipe portion 304, which is opened only on the back side of the head pipe portion 304.

As shown in FIG. 12, the head pipe portion 304 has a hole portion 308 communicated to the leading edge side of the chamber 306, and mounting portions 310a and 310b positioned on the rear end side of the chamber 306. Screw holes 312a and 312b are formed on the mounting portions 310a and 310b, respectively. Main frames 314a and 314b extend rearward from both the rear end portions of the head pipe portion 304, respectively.

As shown in FIG. 10, a front fender 542 and a tire 544 are fixed on the lower ends of front forks 540 which are connected to a handle 317 and extend downward. A fairing 546 is disposed to cover the front portion of the handle 317, and a head lamp 548, a rear view mirror 550 and a screen 552 are provided on the fair ring 546. A tank 554 is disposed on the upper portions of the main frames 314a and 314b, and a seat 556 is provided in the back of the tank 554. In FIG. 10, a top bridge 558 is provided on the side of the handle 317.

A handle lock unit 316 is mounted in the chamber 306 of the head pipe portion 304. The handle lock unit 316 includes a casing 320 supported in the chamber 306 of the head pipe portion 304 by insertion of a stem pipe 318 turned and interlocking with the handle 317. Within the casing 320, a lock member, handle rotation restricting member 322 is provided which is movable between a fixing position where the turning of the handle 317 is made impossible by engagement of the lock member 322 with the stem pipe 318 and a fixing release position where the turning of the handle 317 is made possible; a turning member 324 for freely moving the lock member 322 from the fixing release position to the fixing position by rotation in the direction of the arrow A (one direction) in FIG. 13; and a drive means 323 for stepwise turning the turning member 324 between a first position (ON position, see FIG. 15A) where the turning of the handle 317 is made possible and the operation of the engine is made possible, a second position (OFF position, see FIG. 15B) where the turning of the handle 317 is made possible and the operation of the engine is made impossible, and a third position (lock position, see FIG. 15C) as the fixing position where the turning of the handle 317 is fixed.

Figure 13:
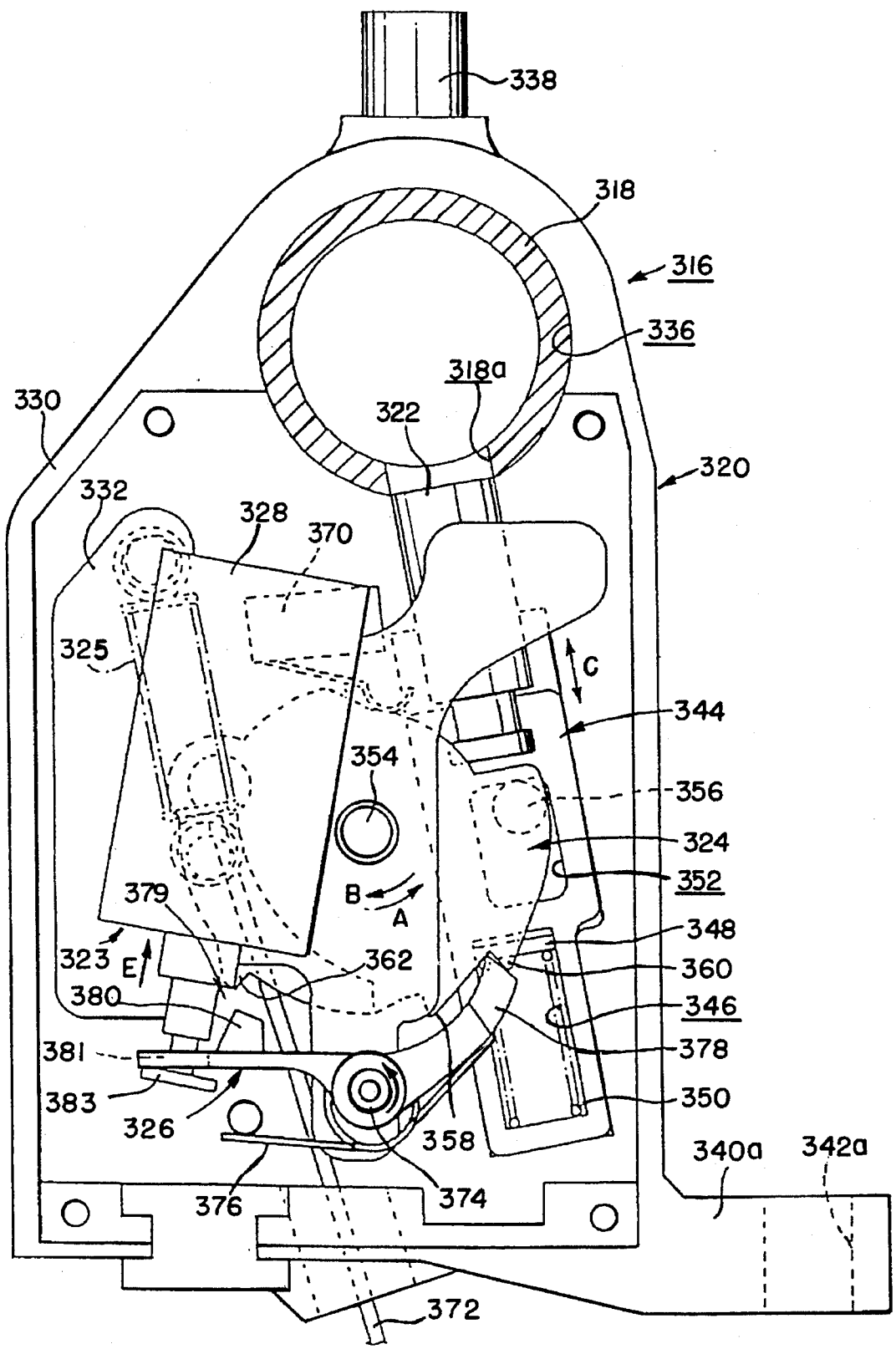
FIG. 13 is a view illustrating the interior of the handle lock unit.
Figure 14:
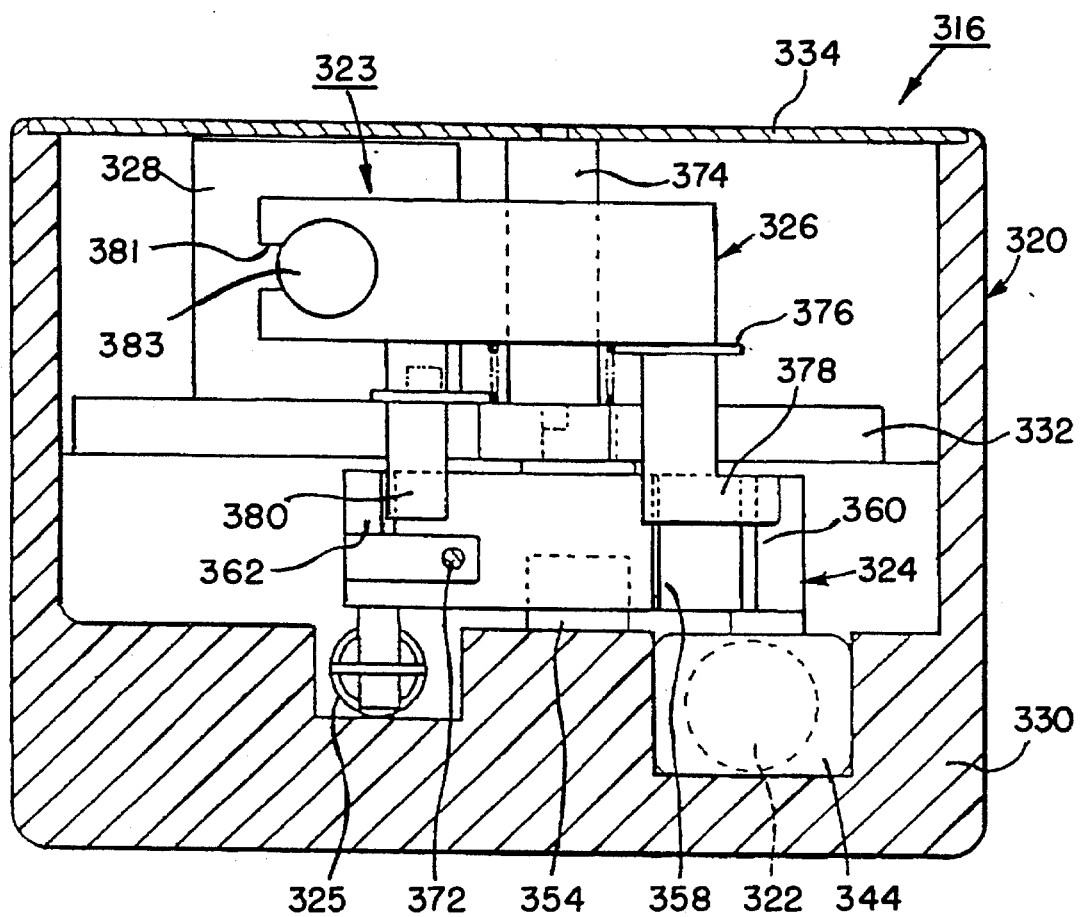
FIG. 14 is a vertical sectional view of the handle lock unit.

As shown in FIGS. 13 and 14, the drive means 323 includes a spring member 325 for giving a rotational force to the turning member 324 in the direction of the arrow B (the other direction) opposed to the direction of the arrow A; a locking member 326 for holding the turning member 324 at a specified angle position; and a solenoid 328 which is driven in interlocking with a starter switch described later for releasing the locking member 326 from the turning member 324 and sequentially turning the turning member 324 from the first position to the third position.

The casing 320 includes a case member 330, an intermediate lid 332 and a cover member 334. A throughhole 336 is formed so that the stem pipe 318 is inserted through the casing 320. A pin portion 338 to be fitted in a hole portion 308 of the head pipe portion 304 is provided at the leading edge of the case member 330. Further, on the rear end portion side of the case member 330, projecting portions 340a and 340b are provided to correspond to the mounting portions 310a and 310b of the head pipe portion 304, respectively. Hole portions 342a and 342b corresponding to the screw holes 312a and 312b are formed on the projecting portions 340a and 340b, respectively (see FIG. 12). In such a state that the pin portion 338 is fitted in the hole portion 308, set screws 343a and 343b are inserted in the hole portions 342a and 342b and the leading edges of the set screws 343a and 343b are screwed to the screw holes 312a and 312b, respectively, so that the casing 320 is mounted to the head pipe portion 304.

As shown in FIG. 13, the lock member 322 has a column shape, and is fixed on one end side of a supporting body 344 which is freely moved forward and backward in the direction of the arrow C toward the interior of the case member 330. An opening portion 346 is formed on the other end side of the supporting body 344. A fixed plate 348 provided in the casing 320 is inserted in the opening portion 346, and both ends of a spring member 350 are engaged by the spring force with the fixed plate 348 and the inner wall surface the opening portion 346. A rectangular guide groove 352 is provided at the substantially central portion of the supporting body 344.

The turning member 324 is turnably disposed in the casing 320 through a fulcrum pin 354. On the outer peripheral edge portion of the turning member 324, an eccentric pin 356 to be inserted in the guide groove 352 of the supporting body 344 is provided so as to project on the guide groove 352 side. On the outer peripheral portion of the turning member 324, there are provided a first locking stepped portion 358 which is engaged with the locking member 326 for holding the turning member 324 at the third position (lock position), a second locking stepped portion 360 which is engaged with the locking member 326 for holding the turning member 324 at the second position (OFF position), and a cam portion 362 spaced apart by a specified angle from the first locking stepped portion 358 in the direction of the arrow B.

The end portion of the spring member 325 is engaged with the outer peripheral edge portion of the turning member 324 at the position opposed to the eccentric pin 356. A cable 372 fixed at its one end to the turning member 324 extends outward from the casing 320 to be connected to an operating member described later, see FIG. 11.

The locking member 326 is turnably mounted on a fulcrum pin 374 fixed in the casing 320, and is biased in the direction of the arrow D in FIG. 13 by a spring 376 wound around the fulcrum pin 374. A locking projection piece 378 and a projecting portion 380 are provided on the locking member 326 so as to project to the side of the turning member 324. The locking projection piece 378 is engaged with the first and second locking stepped portions 358 and 360. Further, a holding means 379 for holding the turning member 324 at the second position (OFF position) includes a projecting portion 380 and a cam portion 362. A slit groove portion 381 is formed on the end portion of the locking member 326, and a locking large diameter portion 383 projecting from the solenoid 328 is engaged with the slit groove portion 381.

Under the handle lock unit 316, an operating lever 385 as the operating member is rockably supported on the head pipe portion 304 so as to be in a parallel arrangement to a choke lever 560, see FIG. 10. A cable 372 with one end fixed on the turning member 324 constituting the handle lock unit 316 is engaged at the other end with the operating lever 385. The operating lever 385 is rockable between the first, second and third positions while being integrated with the turning member 324.

As shown in FIG. 11, a controller 386 constituting a control apparatus for a vehicle according to a third embodiment is held on a stay 382 extending from the head pipe portion 304 to the front body through a holding member 382.

Figure 16:
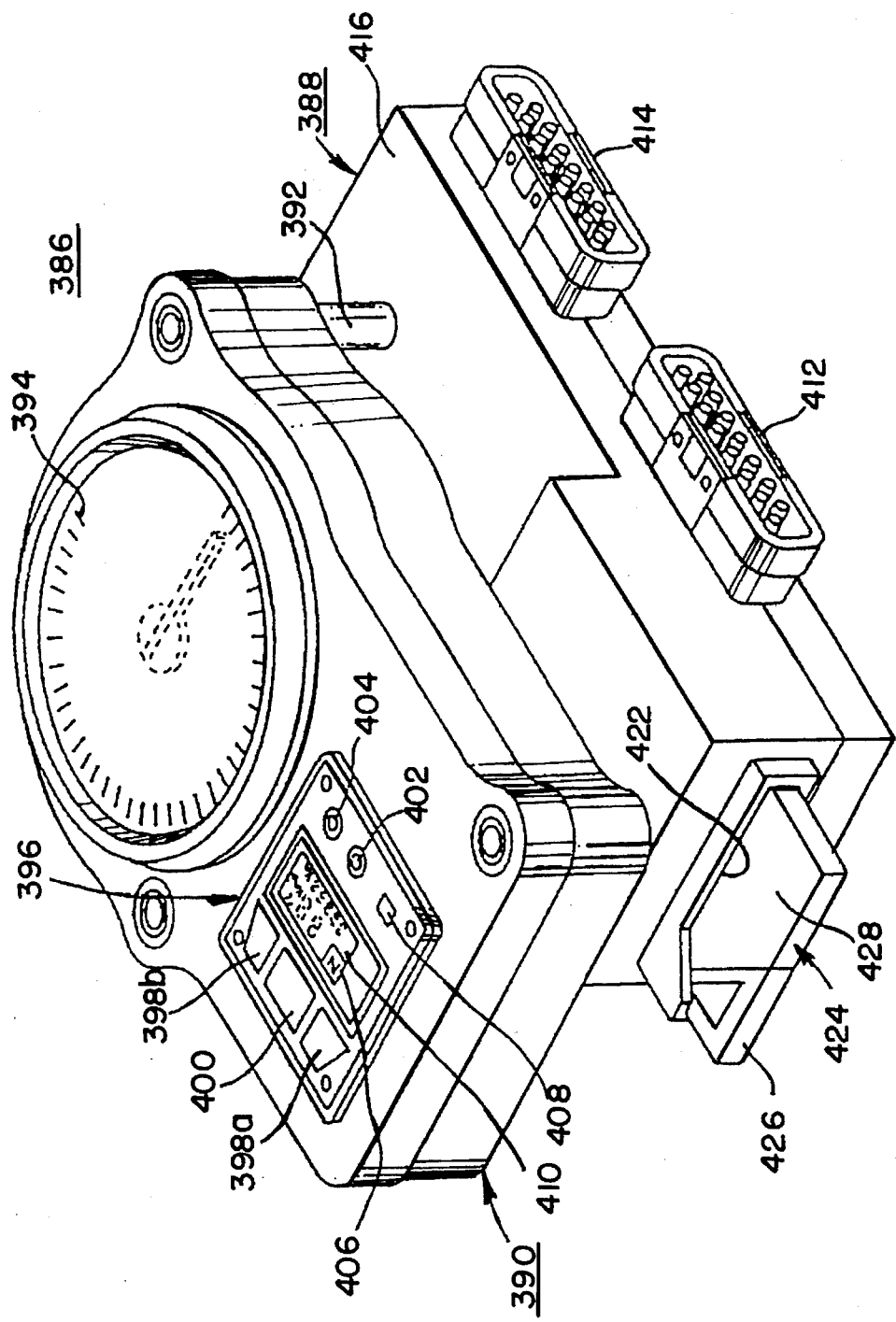
FIG. 16 is a perspective view illustrating a controller of the control apparatus for a vehicle.

As shown in FIG. 16, the controller 386 includes a controller main body 388 and a display set portion 390. The display set portion 390 is supported by a column 392 so as to project from the controller main body 388 which includes a first indicator (tachometer) 394 for an analog indication of the rotational state of the engine, and a second indicator 396 for a digital indication of the same. The second indicator 396 includes direction indicators 398a and 398b; a high beam display portion 400; a side stand display portion 402; an alarm display portion 404; a neutral display portion 406; and a multidisplay portion 410 for switchably displaying the running distance, trip, water temperature and various alarms by a function switch 408, which serves as a speed meter.

Figure 17:
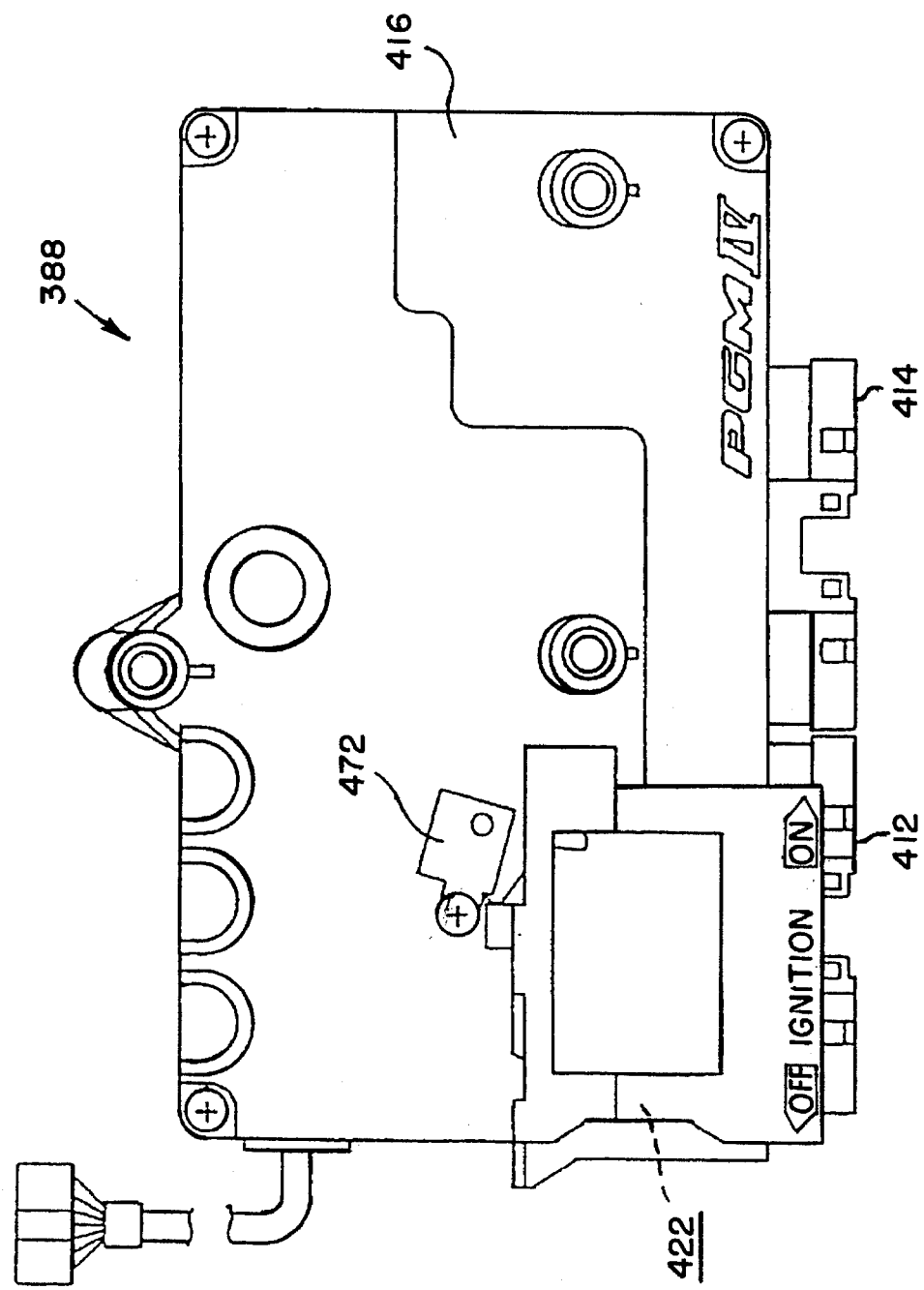
FIG. 17 is a plan view of a controller main body constituting the controller.
Figure 18:
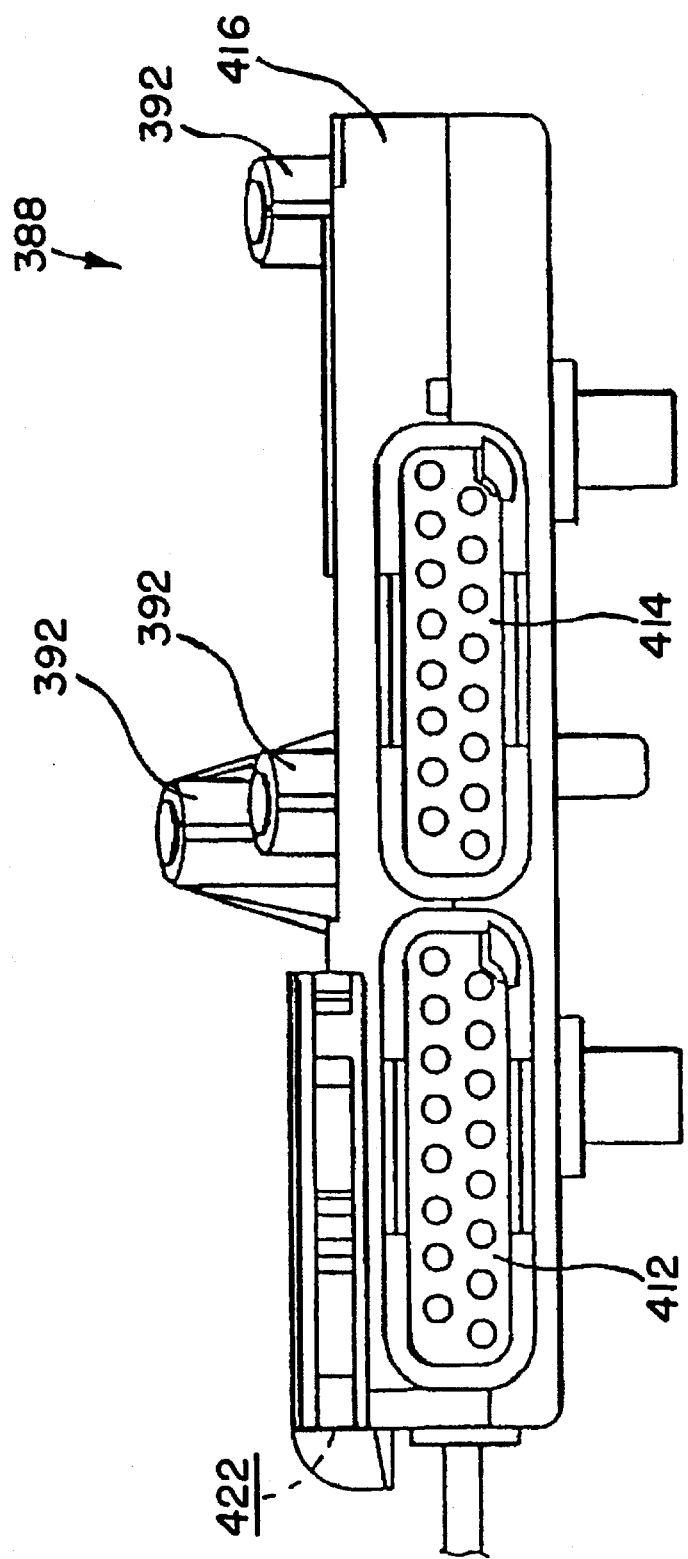
FIG. 18 is a front view of the controller main body.
Figure 19:
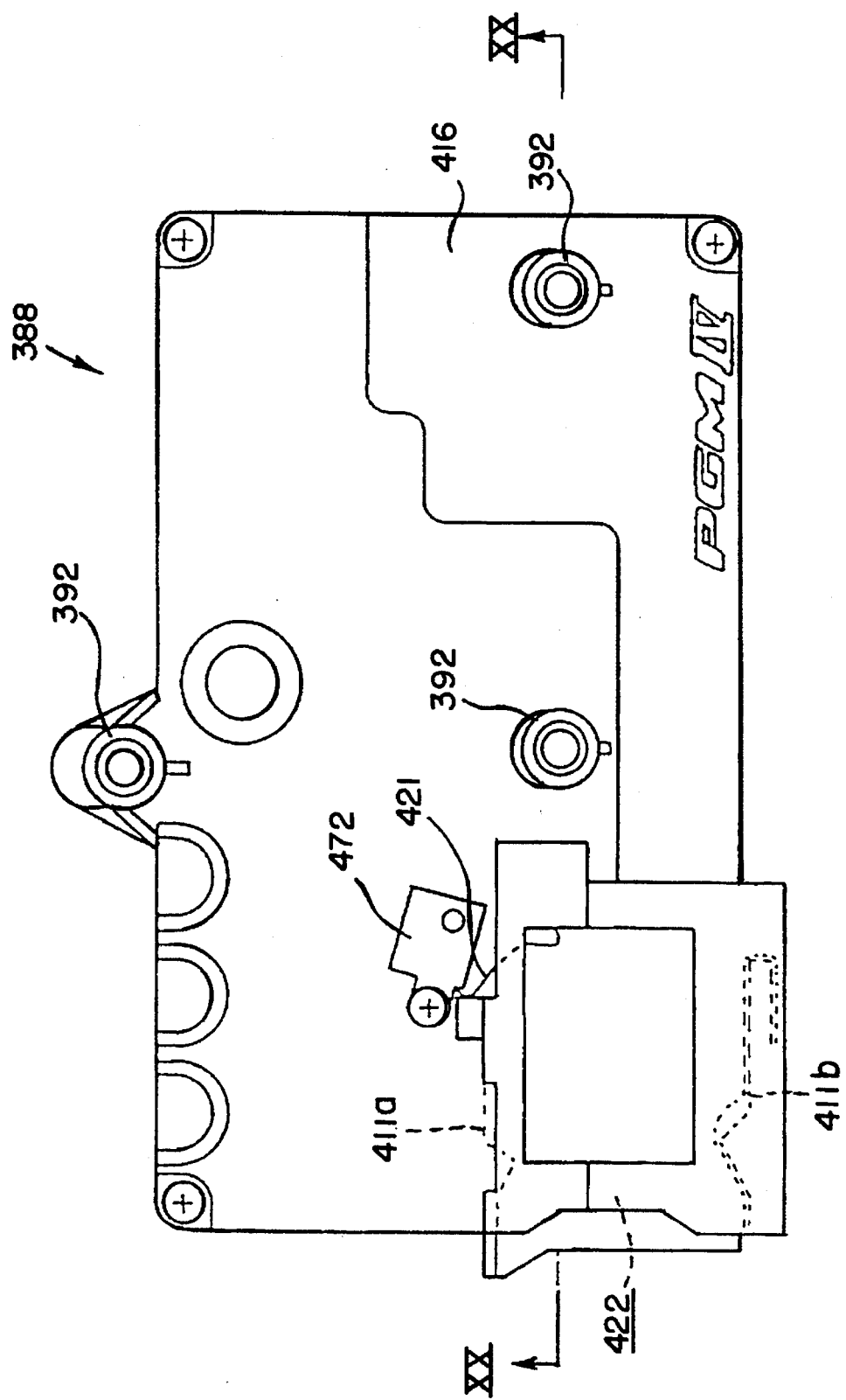
FIG. 19 is a plan view of the controller main body, with parts partially omitted.
Figure 20:
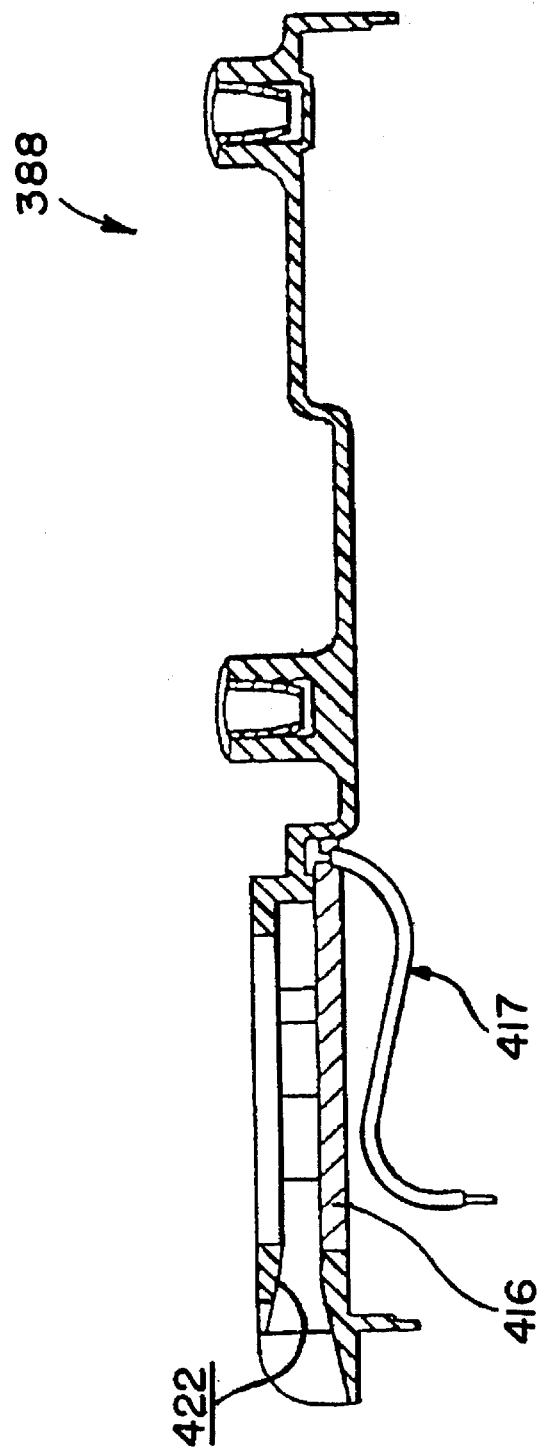
FIG. 20 is a sectional view taken along the line XX—XX of FIG. 19.

FIGS. 17 and 18 are a plan view and a front view of the controller main body 388, respectively. FIG. 19 is a plan view showing lock plates 411a and 411b provided on the controller main body 388 for preventing the fallout of a key 424, with parts partially omitted. FIG. 20 is a sectional view taken along the line XX—XX of FIG. 19. The controller main body 388 has a casing 416 provided with connectors 412 and 414 freely connected to the power supply line and the signal line connected to a battery 484. Within the casing 416, a transmitting power generation coil 418 and a receiving communication coil 420 connected to a CPU described later are provided through cords 417, see FIGS. 20 and 21. An opening portion 422 is provided on one side portion of the casing 416 in such a manner that a flat plate-like key 424 is freely inserted in the opening portion 422. When the key 424 is inserted in the opening portion 422, a spring 421 is elastically deformed and a card insertion key 472 is turned ON, see FIG. 19.

Figure 21:
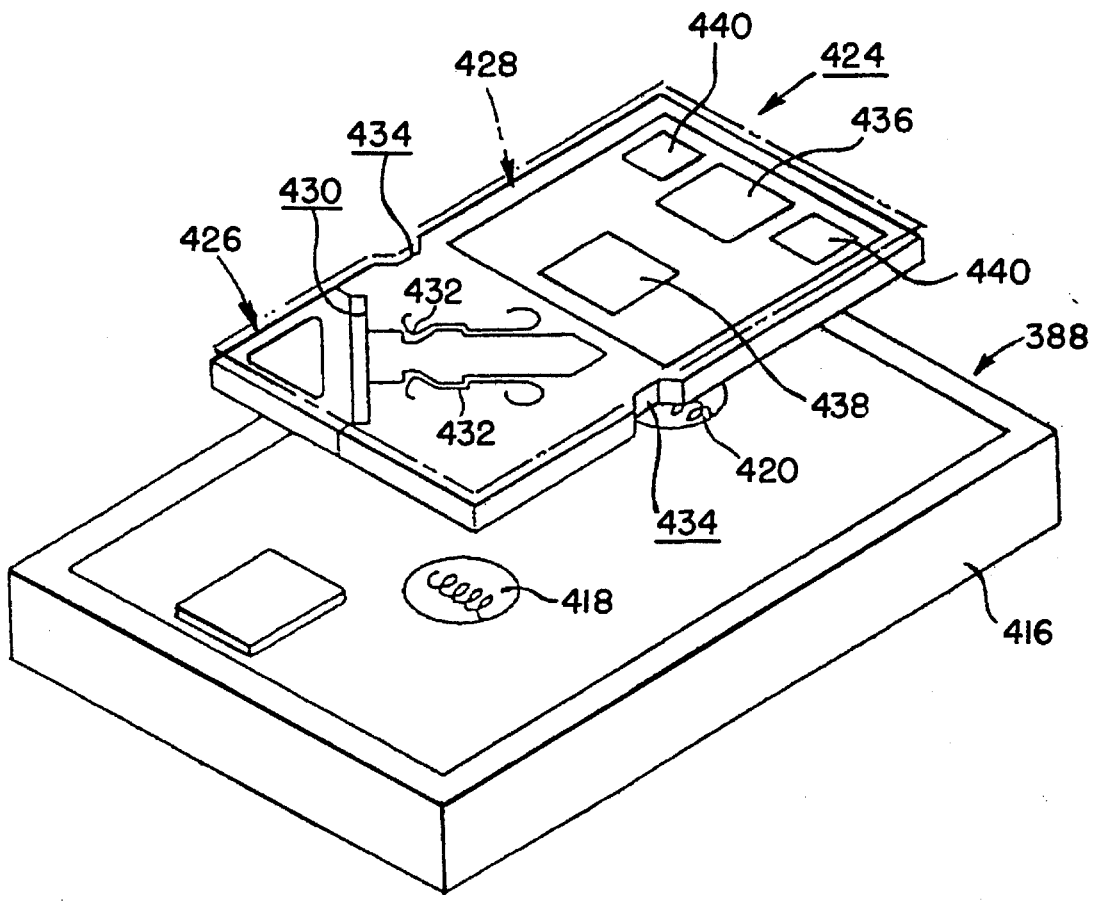
FIG. 21 is a schematic perspective view illustrating the controller and the key.
Figure 22:
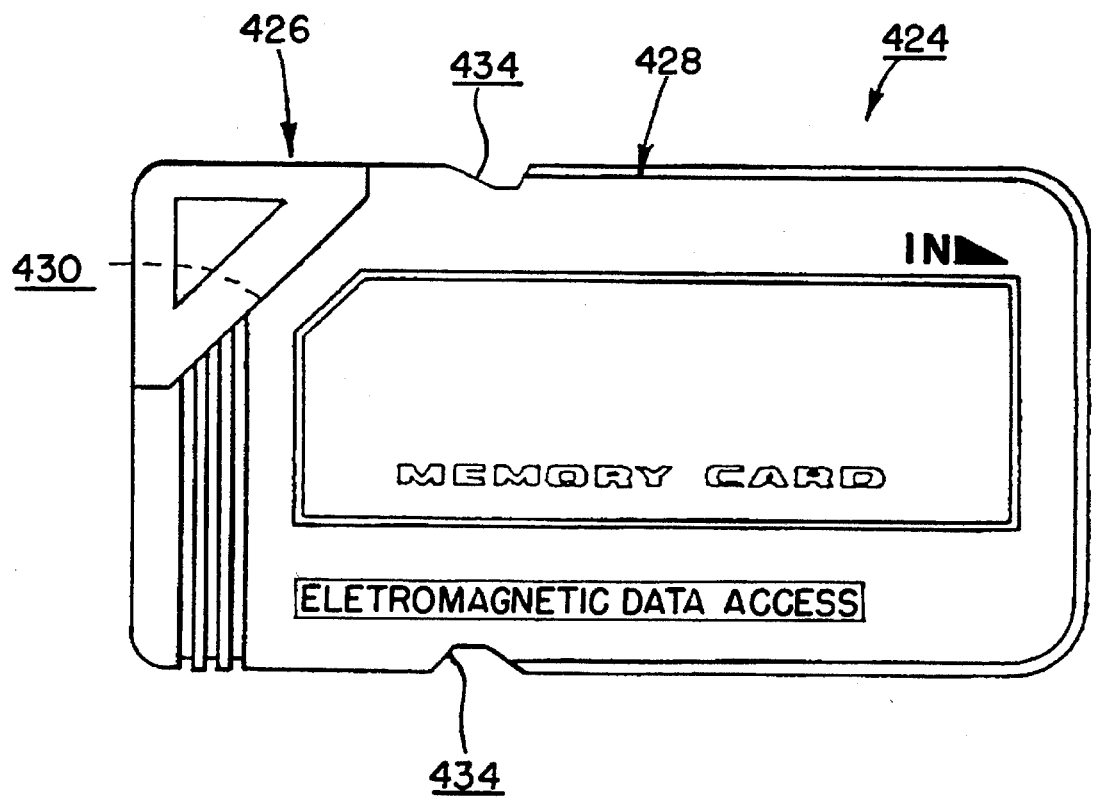
FIG. 22 is a plan view illustrating the key.

As shown in FIGS. 21 and 22, the key 424 includes a key member 426 and a flat case (main body) 428. An insertion portion 430 is formed by cutting-out of one corner portion of the case 426, and the key member 426 is inserted and fitted into the insertion portion 430. A pair of lock plates 432 for preventing the fallout of the key member 426 are provided in the insertion portion 430. Notch portions 434 are formed on both side portions of the case 428. Further, on the surface of the case 428, a non-contact IC card 436, a pair of receiving power generation coils 438 corresponding to the power generation coil 418 provided on the controller main body 388 and a transmitting communication coil 440 corresponding to the communication coil 420 are provided.

Figure 23:
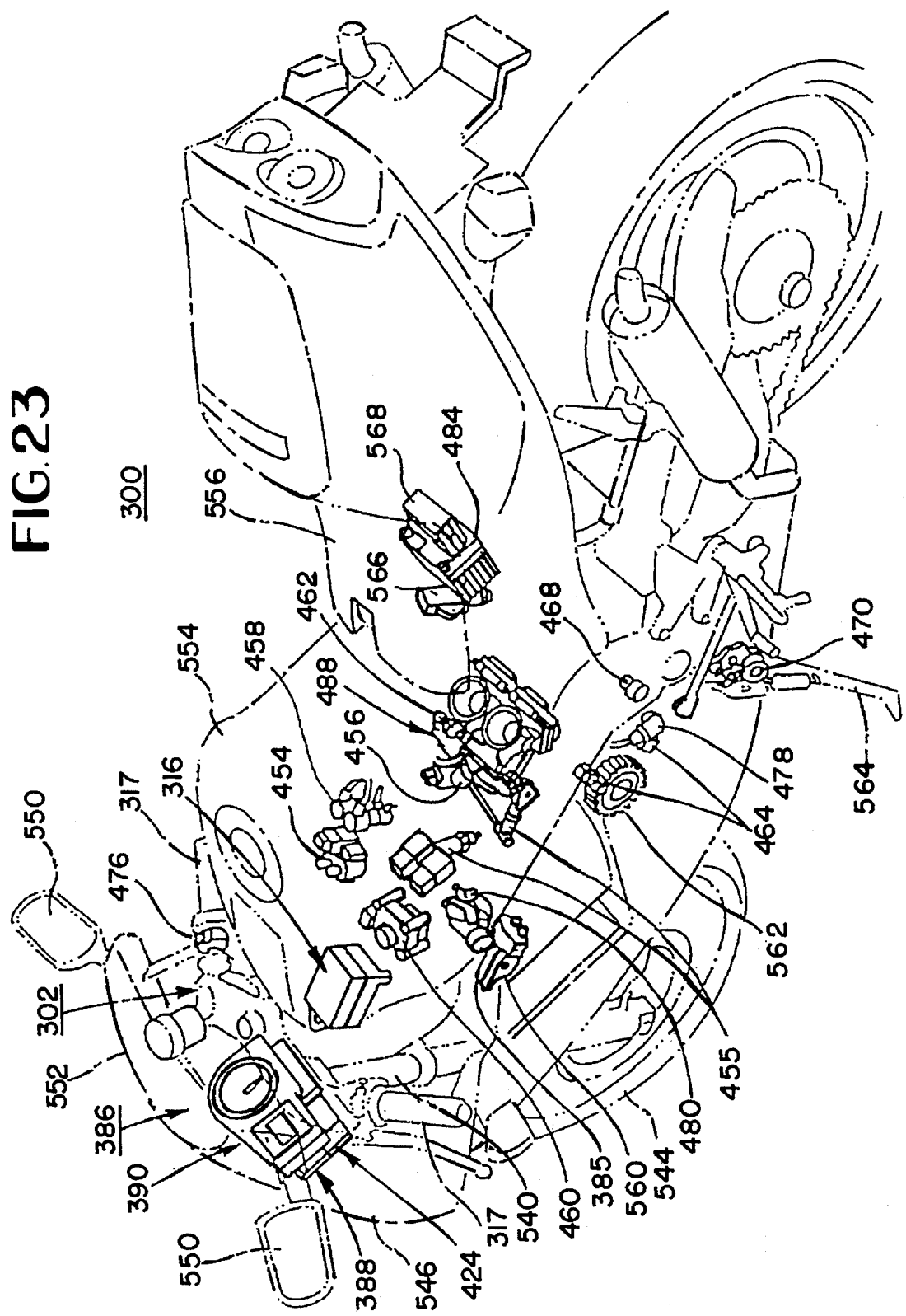
FIG. 23 is a perspective view illustrating the inner structure of the motorcycle.
Figure 24:
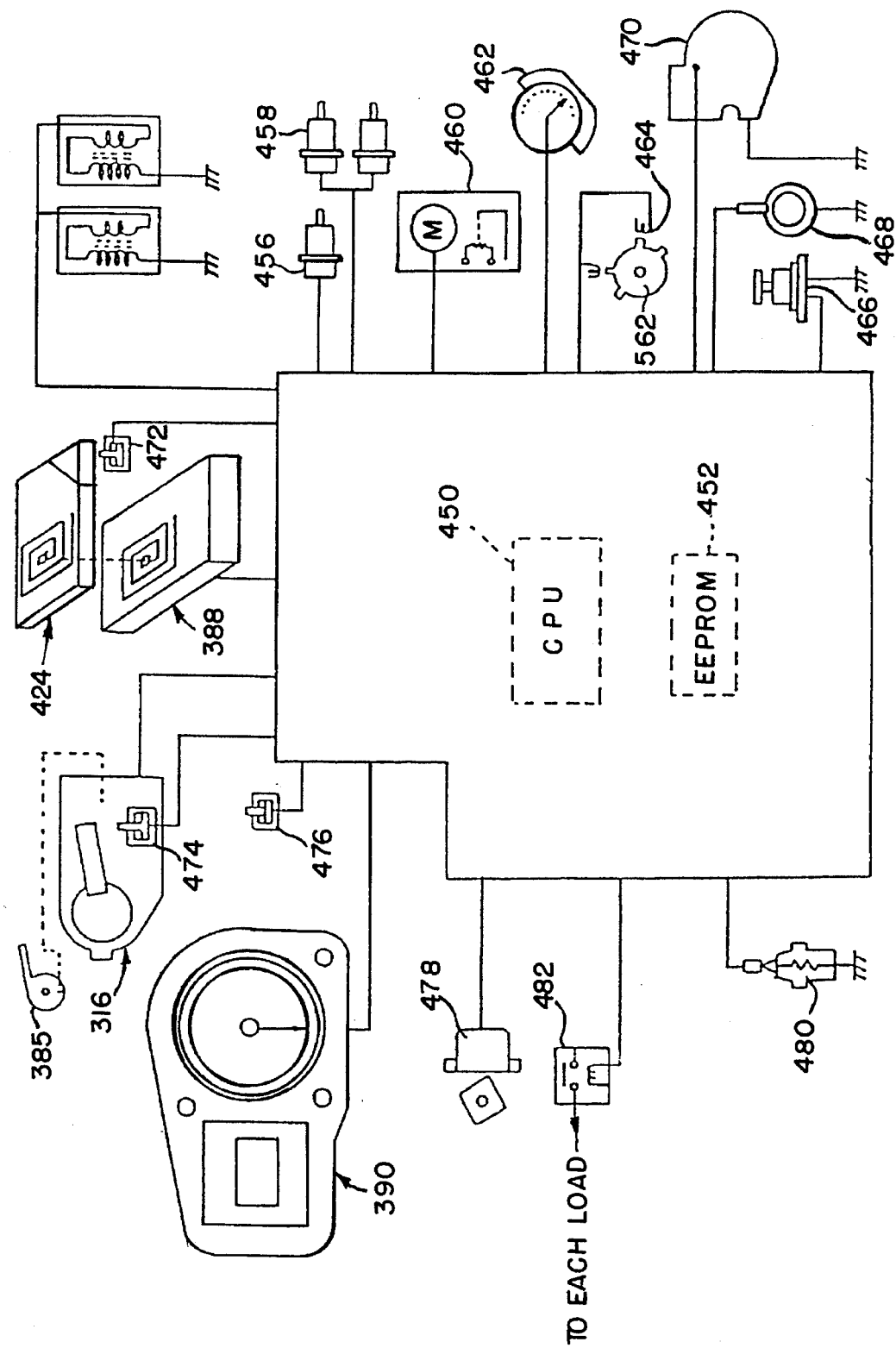
FIG. 24 is a schematic construction view of a controller of the control apparatus for a vehicle.
Figure 25:
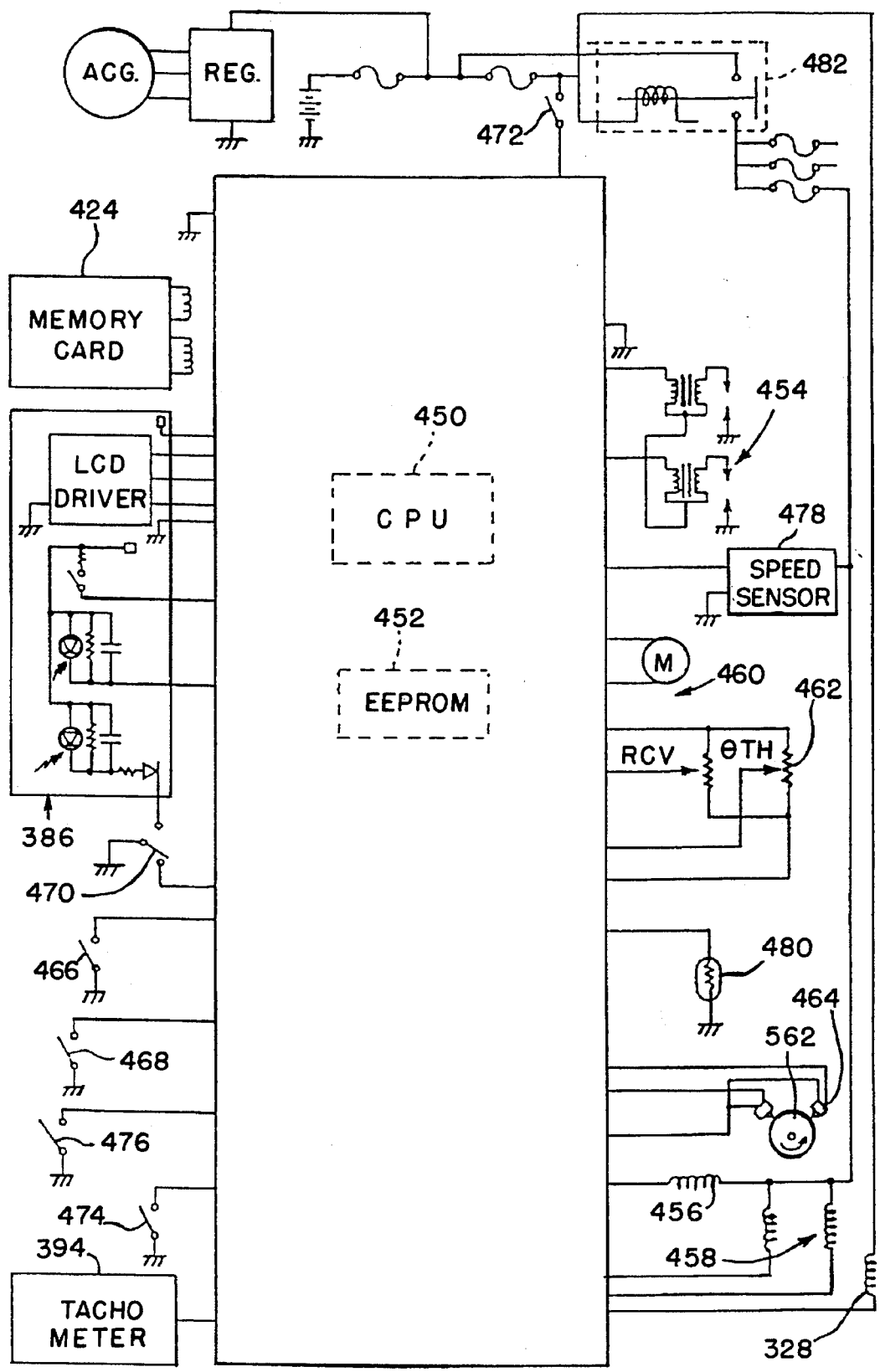
FIG. 25 is an electric circuit diagram of the controller.

FIGS. 23 and 24 are views showing a controller 386. FIG. 25 is an electric circuit diagram of the controller 386. The controller 386 includes a CPU 450. The CPU 450 is provided with an EEPROM 452 for storing the characteristic data such as recital number, odometer, and trip meter. Further, the CPU 450 is connected to an ignition coil 454; an oil pump solenoid 456; a pair of carburetor solenoids 458; a servo-motor 460 for an exhauster; a throttle sensor 462; a crank angle pulser 464; an oil level switch 466; a neutral switch 468; a side stand switch 470; a card insertion switch 472; an ON detection switch 474 for generating an ON signal when the lock of the handle lock unit 316 is released, a kill switch 476, a vehicle speed detection sensor 478, a thermosensor 480 and a main relay 482 connected to each load other than the engine control system.

In addition, the construction of the above controller 386 will be described with reference to FIG. 23. A V-type two cycle cylinder engine (not shown) is provided under a tank 554, and an ignition plug 455 is provided on the engine, and the ignition coil 545 is connected to the ignition plug 455, which are contained under the tank 554. In the back of the engine, a carburetor 488 is disposed, and the throttle sensor 462 is provided in the carburetor 488. The carburetor solenoid 458 for controlling the amount of air to the carburetor 488 is provided under the tank 554 in proximity to the carburetor 488.

An AC generator 562 is disposed at the end of the left crank shaft of the engine. The crank angle pulser 464 is connected radially outwardly of the AC generator 562. The car speed detection sensor 478 is provided on the left side end of a counter shaft of the engine, and the neutral switch 468 is provided on the lower side of the counter shaft. Further, the side stand switch 470 is mounted on the side stand 564. The regulating rectifier 566 and the battery 484 are disposed in the back of the carburetor and under the seat 556. A fuse box 568 is provided so as to be contiguous to the battery 484.

The thermo-sensor 480 for detecting the temperature of the cooling water is mounted on the upper portion of the engine, and the servo-motor 460 for driving a valve adapted to control the exhaust timing is disposed in proximity to the thermo-sensor 480 and the handle lock unit 316.

Figure 26:
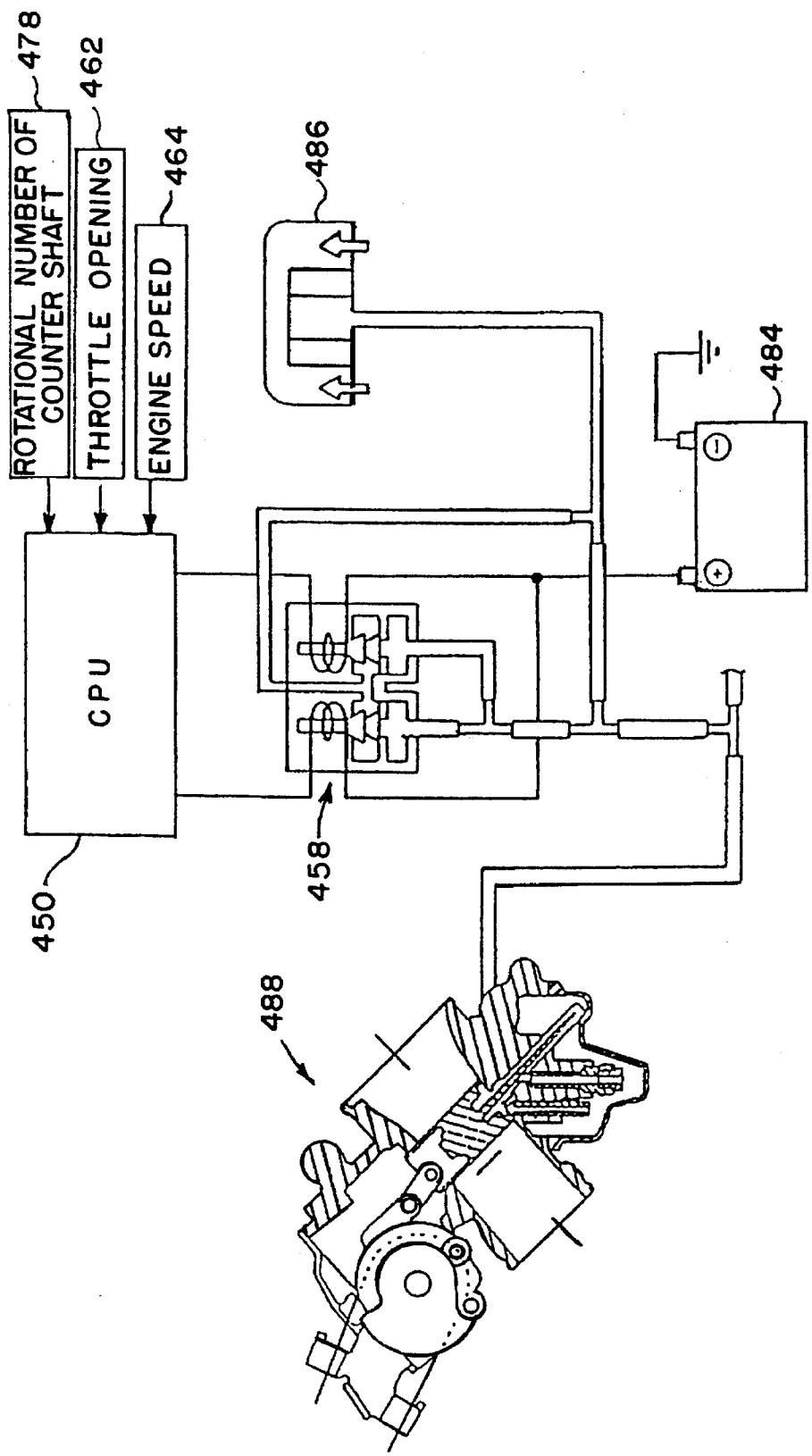
FIG. 26 is a control circuit diagram of a carburetor solenoid constituting the controller.

As shown in FIG. 26, the carburetor solenoid 458 is connected to the battery 484, and which functions to supply an ideal air-fuel mixture from the carburetor 488 to the engine by adjustment of the amount of air supplied to the carburetor 488 through an air cleaner 486. The CPU 450 receives an engine speed from the crank angle pulser 464, a throttle opening from the output voltage of the throttle sensor 462 and a counter shaft rotational number from the pulse signal of the vehicle speed detection sensor 478 for judging the reduction ratio on the basis of the engine speed and the counter shaft rotational number. The CPU 450 has a program map for operating the carburetor solenoid according to the reduction ratio, and controls the carburetor solenoid 458 so as to supply the air-fuel mixture optimized in the running state according to the car speed, throttle opening and engine speed on the basis of the program map.

Figure 27:
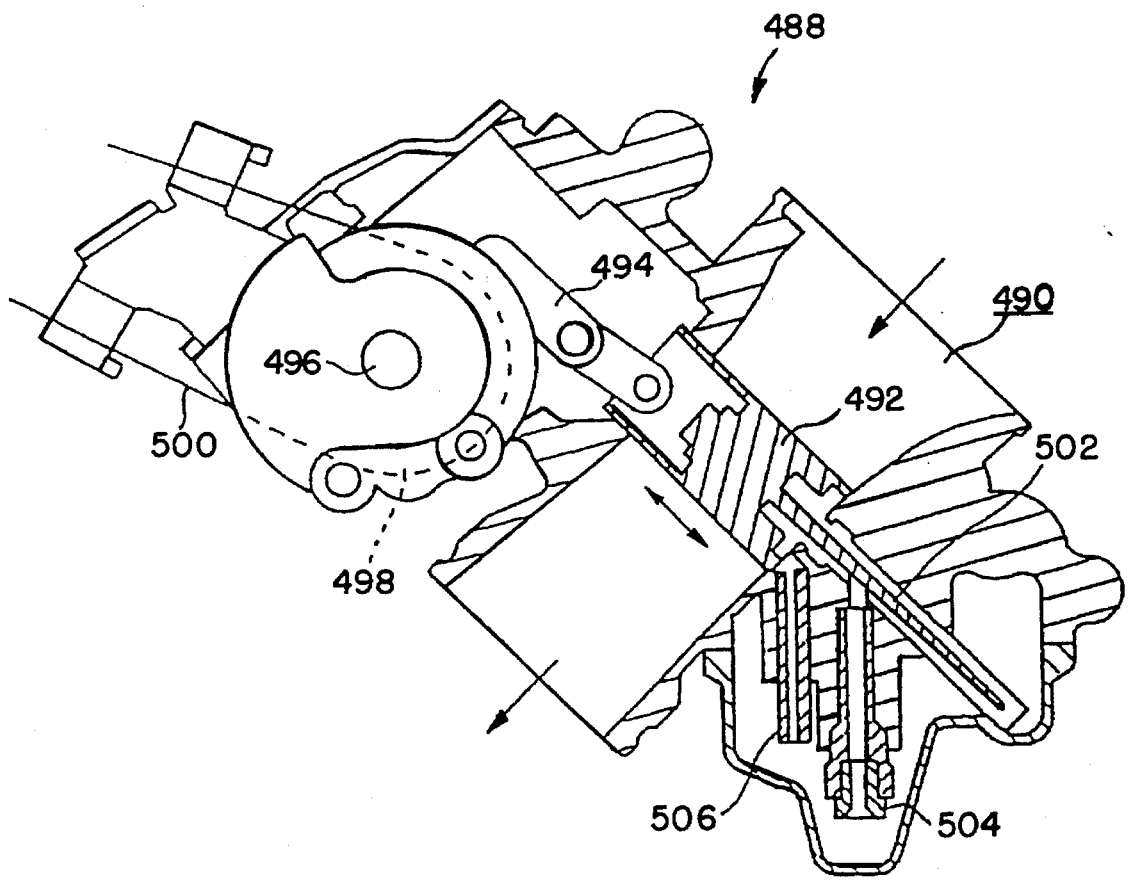
FIG. 27 is a vertical sectional view of a carburetor.
Figure 28:
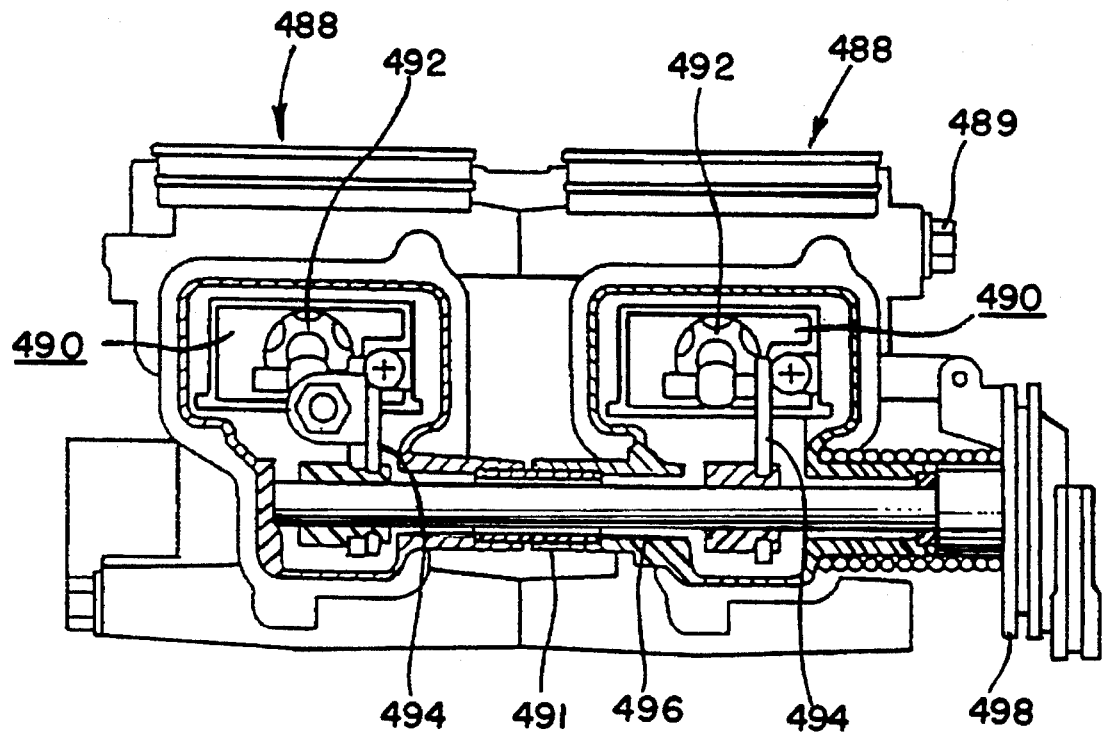
FIG. 28 is a lateral sectional view of the carburetor.

As shown in FIG. 27, the carburetor 488 includes a throttle valve 492 vertically facing to an intake passage 490. The throttle valve 492 is connected to the throttle shaft 496 through a link 494. As shown in FIG. 28, the throttle shaft 496 is integrally inserted in both the right and left carburetors 488. The carburetors 488 are fixed to each other by a connecting bolt 489. A knock pin 491 through which a throttle shaft 496 is inserted is disposed on the connecting portion where the carburetors 488 are connected to each other.

The throttle shaft 496 is rotated by the operation of a throttle pulley 498 and a throttle cable 500. A needle jet 502 is provided on the end portion of the throttle valve 492, and a main jet 504 and a slow jet 506 are formed in proximity to the needle jet 502, see FIG. 27.

Figure 29:
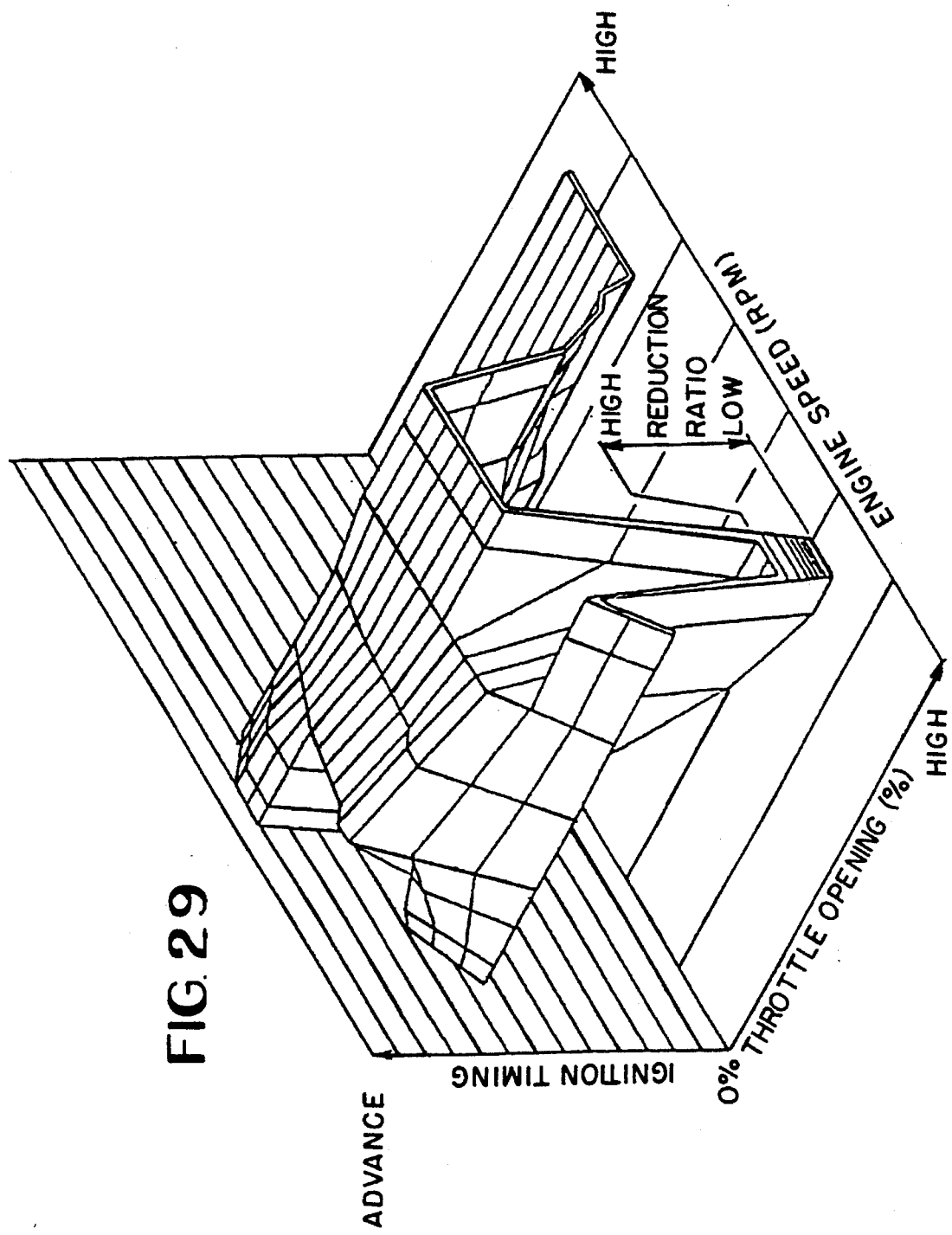
FIG. 29 is a characteristic view of an ignition timing in association with the throttle opening and the engine speed.

In addition, the ignition timing of the engine is set according to the throttle opening (%), the engine speed (rpm) and the reduction ratio. For example, the ignition timing characteristic of the front bank is shown in FIG. 29.

Figure 30:
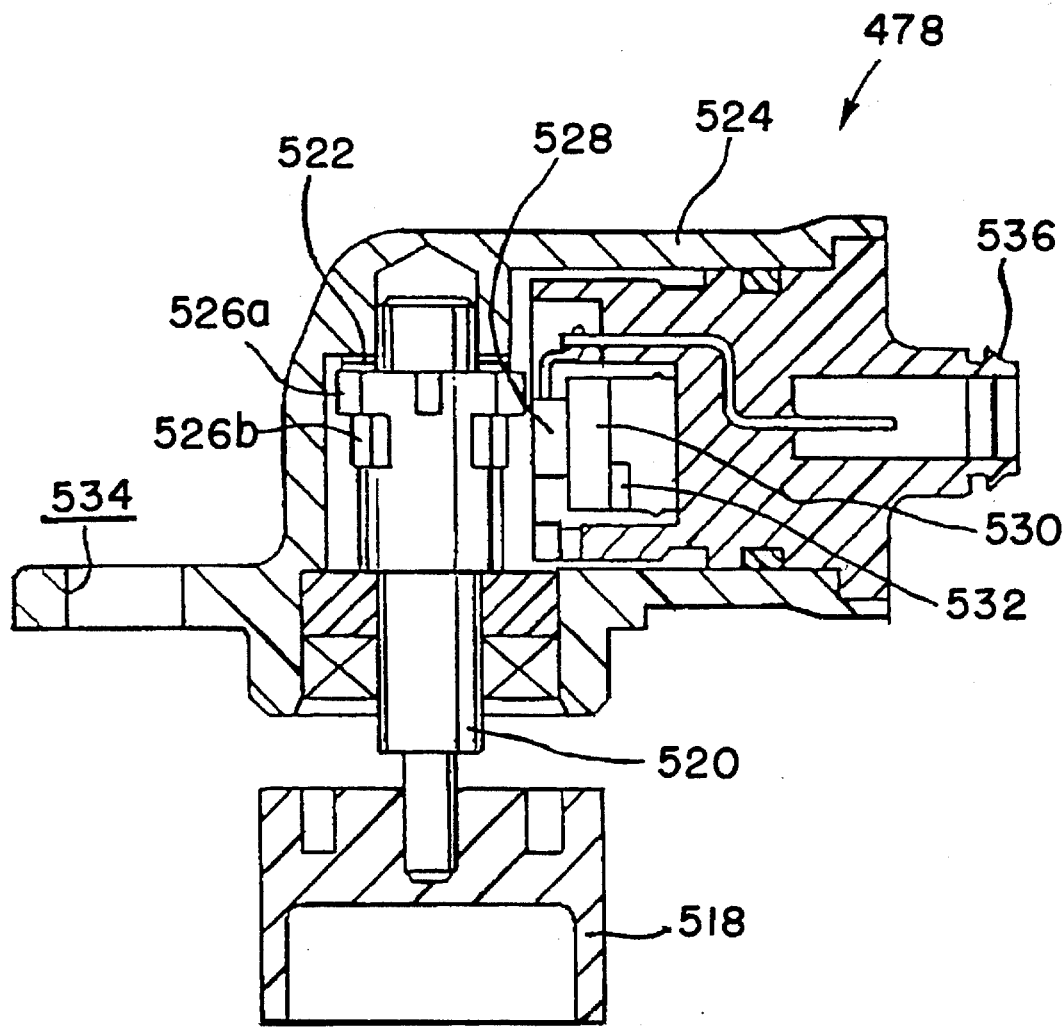
FIG. 30 is a vertical sectional view of a speed sensor.

As shown in FIG. 30, the vehicle speed sensor 478 includes a sensor shaft 520 rotated integrally with a counter shaft (not shown) connected to a joint 518. The sensor shaft 520 is rotatably held by a housing 524 through a thrust washer 522. The sensor washer 520 is provided with double gear portions 526a and 526b. A hole IC 528 and a rare earth magnet 530 are disposed within the housing 524 so as to face to the gear portion 526b. A yoke 532 is provided on the rare earth magnet 530. When the sensor shaft 520 is rotated, the hole IC 528 receives the change in the magnetic flux for converting the voltage generated from the hole device into the rectangular wave of 0 to 5 V and for outputting it to the CPU 450. A mounting hole portion 534 is formed on the housing 524, and a coupler 536 for electrically connecting the housing 524 to the CPU 450 is fixed on the housing 524.

Next, the operation of the control apparatus for a vehicle according to a second embodiment having the above construction will be described in association with a motorcycle 300.

As the key 424 is inserted from the opening portion 422 of the controller main body 388 constituting the controller 386 into the controller main body 388, the spring 421 is elastically deformed to drive the card insertion switch 472, so that power is supplied to the control unit. Current is allowed to flow into the power generation coil 418 within the controller main body 388 to generate a magnetic force, and the power generation coil 438 on the key 424 side receives the magnetic force to generate power. By the power thus generated, the recital number or the like previously stored in the non-contact IC card 436 provided on the key 424 is converted into current, which is transmitted from the communication coil 440 to the CPU 450 through the communication coil 420 within the controller main body 388.

Figure 31:
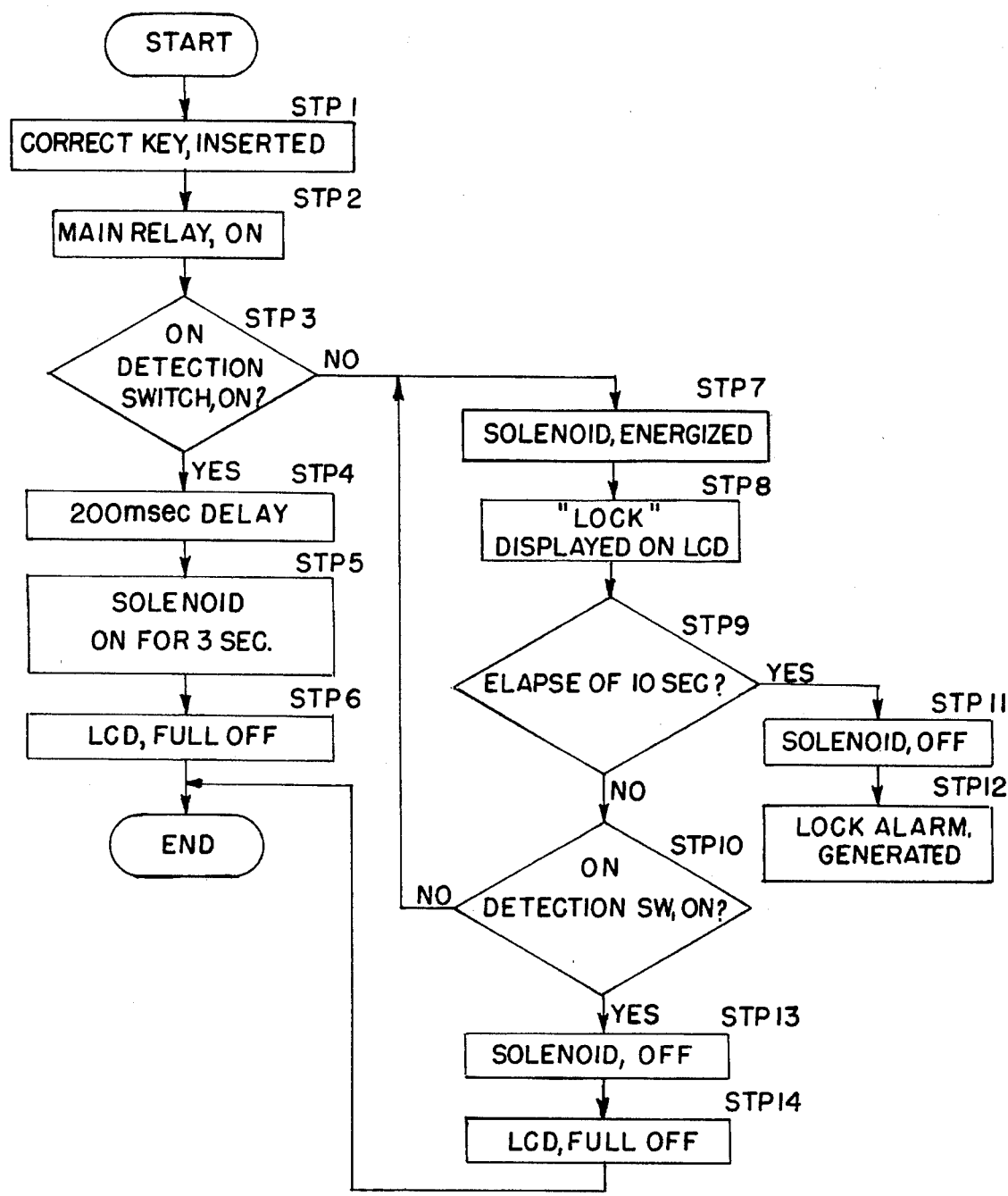
FIG. 31 is a control flow chart for a solenoid constituting the handle lock unit.

When the CPU 450 judges that the correct key 424 is inserted, step S1 in FIG. 31, the solenoid 328 constituting the handle lock unit 316 is possibly in the power supply state through the CPU 450, and also is possibly in the CDI (capacity discharge ignition) state. In FIG. 31, when the process advances from the step S1 to the step S2 wherein the main relay 482 is turned ON, the ON/OFF of the ON detection switch 474 is judged, step S3. When it is judged that the ON detection switch 474 is in the ON state, that is, the handle lock is released, the process advances from the step S4 to the step S5 wherein the solenoid 328 is energized for 3 seconds for ensuring the release of the handle lock. Then, the LCD, multi-display portion 410, of the display set portion 390 of the controller 386 is fully turned OFF, step S6.

On the other hand, when it is judged that the handle lock is not released in the step S3, the solenoid 328 is energized and the LCD of the display set portion 390 is displayed as "LOCK," steps S7 and S8. Further, when the ON detection switch 474 is not turned ON even by energizing the solenoid 328 for 10 seconds or more, steps S9 and S10, the energization to the solenoid 328 is stopped, step S11, the alarm display portion 404 is illuminated for generating the alarm "LOCK," step S12. In addition, when the 0N detection switch 474 is turned ON by energization of the solenoid 328 for less than 10 seconds, step S10, YES, the solenoid 328 is turned OFF, to fully turn OFF the LCD of the display set portion 390, steps S13 and 14.

As described above, when the correct key 424 is inserted and the solenoid 328 is driven for a specified time, as shown in FIG. 13, the locking large diameter portion 383 is moved inward, in the direction of the arrow E. Accordingly, the locking member 326 is rocked in the direction opposed to the direction of the arrow D against the spring 376, so that the locking projecting piece 378 is separated from the first locking stepped portion 358 of the turning member 324. Thus the turning member 324 is rotated in the direction of the arrow B by the tension of the spring member 325.

When the turning member 324 is rotated in the direction of the arrow B by a specified angle, the cam portion 362 provided on the turning member 324 is engaged with the projecting portion 380 of the locking member 326, so that the locking member 326 is rocked in the direction of the arrow D. Accordingly, the locking projecting piece 378 of the locking member 326 is engaged with the second locking stepped portion 360 of the turning member 324 for holding the turning member 324, so that the turning member 324 is turned from the first position, locked position, to the second position, OFF position. Accordingly, the supporting body 344 and the lock member 322 are integrally moved in the direction being separated from the stem pipe 318 under the guide action of the eccentric pin 356 of the turning member 324 and the guide groove 352 of the supporting body 344, so that the fixing action of the stem pipe 318 by the lock member 322 is released, which makes it possible to turn the handle 317, shifted from FIG. 15C to FIG. 15B. At this time, the operating lever 385 connected to the turning member 324 through the cable 372 is automatically rocked in the direction of the arrow F in FIG. 11 by a specified angle accompanied with the rotation of the turning member 324, to be thus stopped at the OFF position.

Figure 15A:
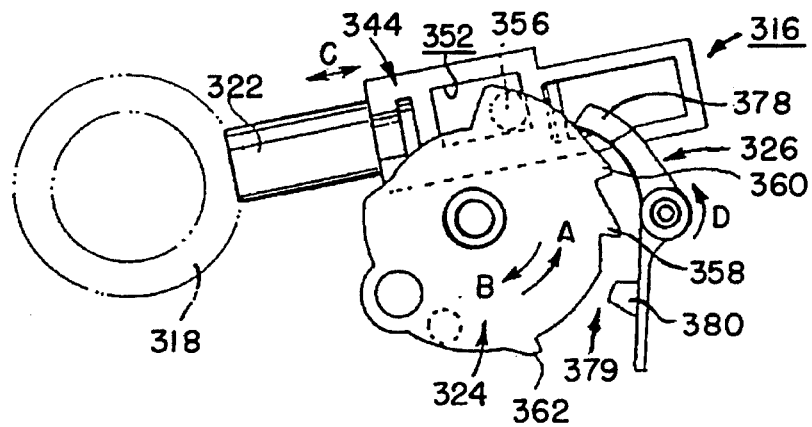
Figure 15B:
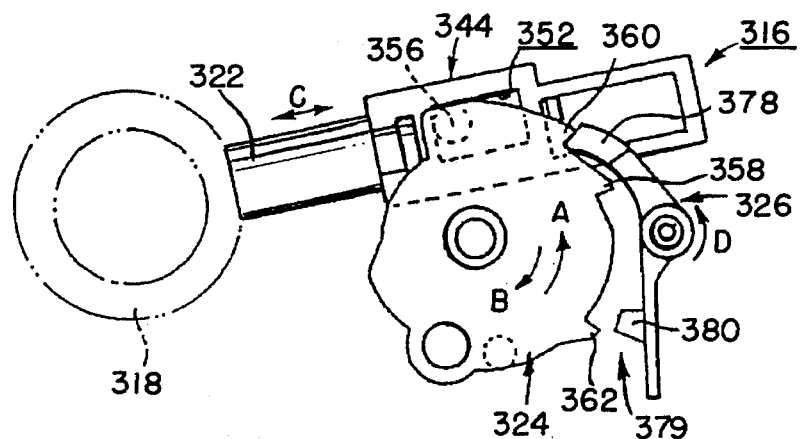
Figure 15C:
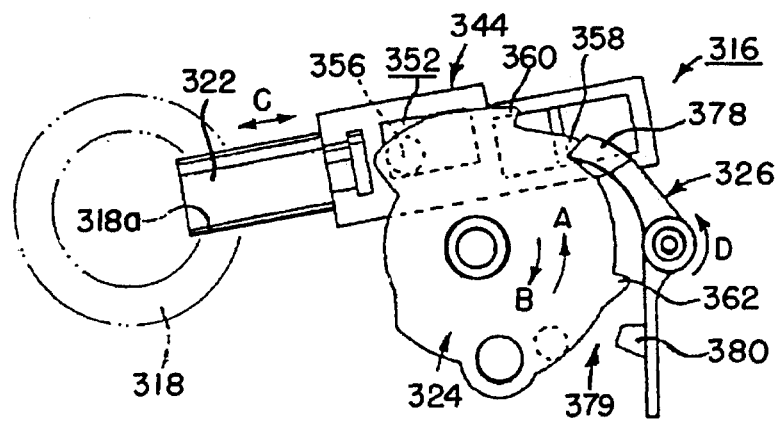

Next, when the solenoid 328 is driven by a specified time and is rocked in the direction opposed to the direction of the arrow D, and the locking projecting piece 378 is separated from the second locking stepped portion 360 of the turning member 324, the turning member 324 is further rotated in the direction of the arrow B, see FIG. 15A. At this time, the operating lever 385 is further automatically rocked in the direction of the arrow F through the cable 372. The starter is thus started to operate the engine, to obtain an operating state.

As shown in FIG. 16, the speed of the motorcycle 300 during running is displayed on the multi-display portion 410 of the display set portion 390. Under the speed display, the total running distance, trip and water temperature are sequentially switchably displayed by pushing of the function key 408. As for the speed display, since the vehicle speed pulse counter overflows under 7 km/hr., the speed display is performed by prediction of the car speed by the continuous number of the overflow. Further, when the car speed pulse is not generated for 0.5 sec. or more, the value "0 km/hr." is forcibly displayed; and the display is performed for each 0.1 sec. under 20 km/hr. and for each 0.5 sec. over 20 km/hr. In addition, when the water temperature is more than the specified value, the water temperature display is illuminated and the alarm display portion 404 is illuminated.

Figure 32:
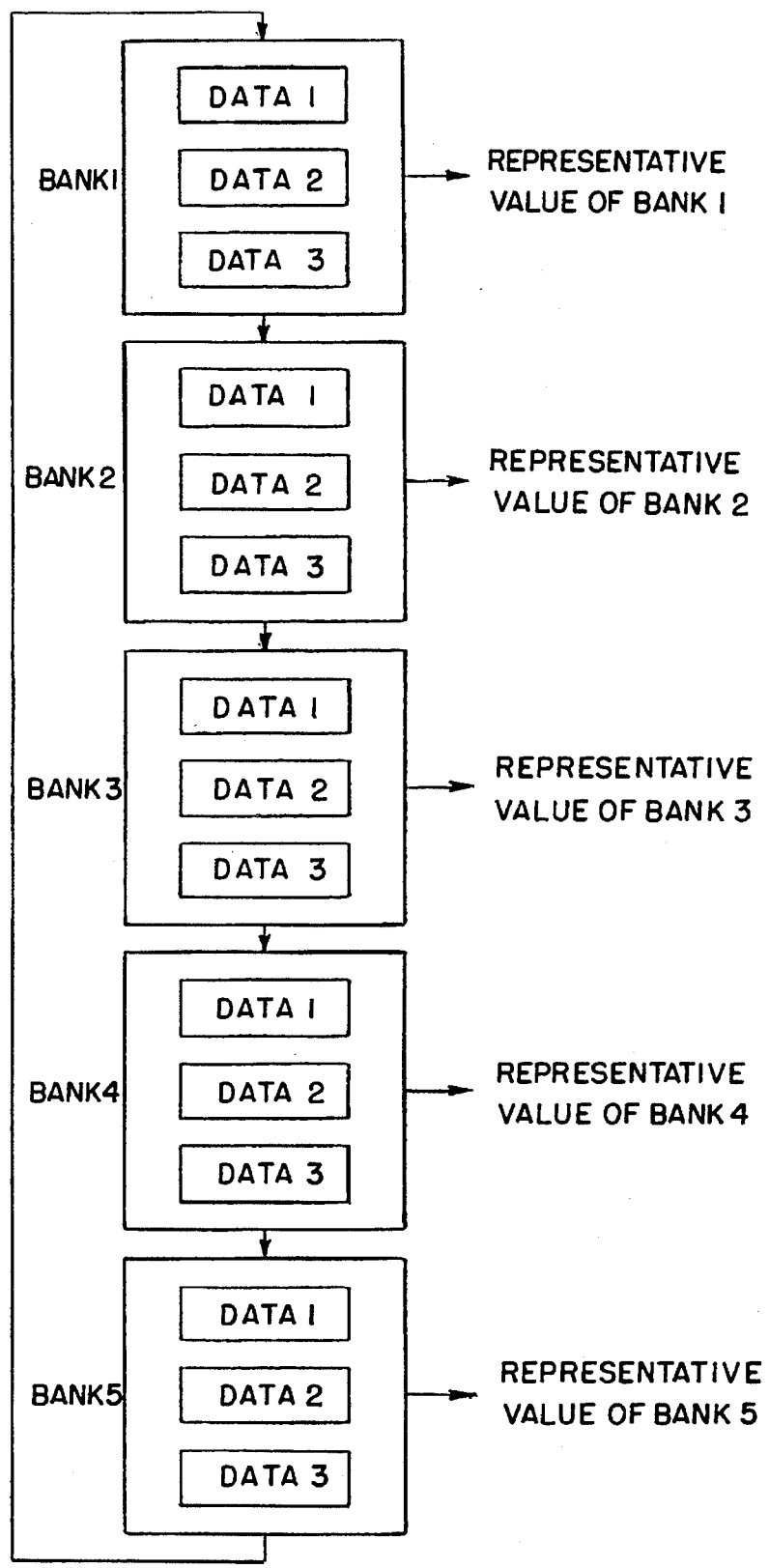
FIG. 32 is a view illustrating a bank in recording control for the total running distance.

The total running distance is recorded in the EEPROM 452 for each 1 km. The EEPROM 452 records the cumulative data less than 1 km. When the power is turned OFF. The cumulative accuracy is 0.1 km. As shown in FIG. 32, the total running distance is recorded in such a manner that the same data is recorded at three portions with respect to one bank for each 1 km; the bank to be recorded is sequentially moved from a bank 1 to a bank 5 for each elapse of 1 km; and is returned from the bank 5 to the bank 1.

In each bank, the bank representative value is determined by the majority among the three data. When the three data are all different from each other, the data value of the bank is made to be indeterminate. The representative value of each bank is theoretically made to be different by 1 km from the representative values of the banks positioned on both sides. The maximum bank value having the above difference of 1 km is actually selected, and is taken as the total running distance. After the total running distance is determined, the cumulation is started for the cumulative data less than 1 km recorded in the other address. In addition, when the maximum bank value is not determined, the total running distance is made to be indeterminate, and the display is performed as ". . . km" and the alarm display portion 404 is illuminated.

Figure 33:
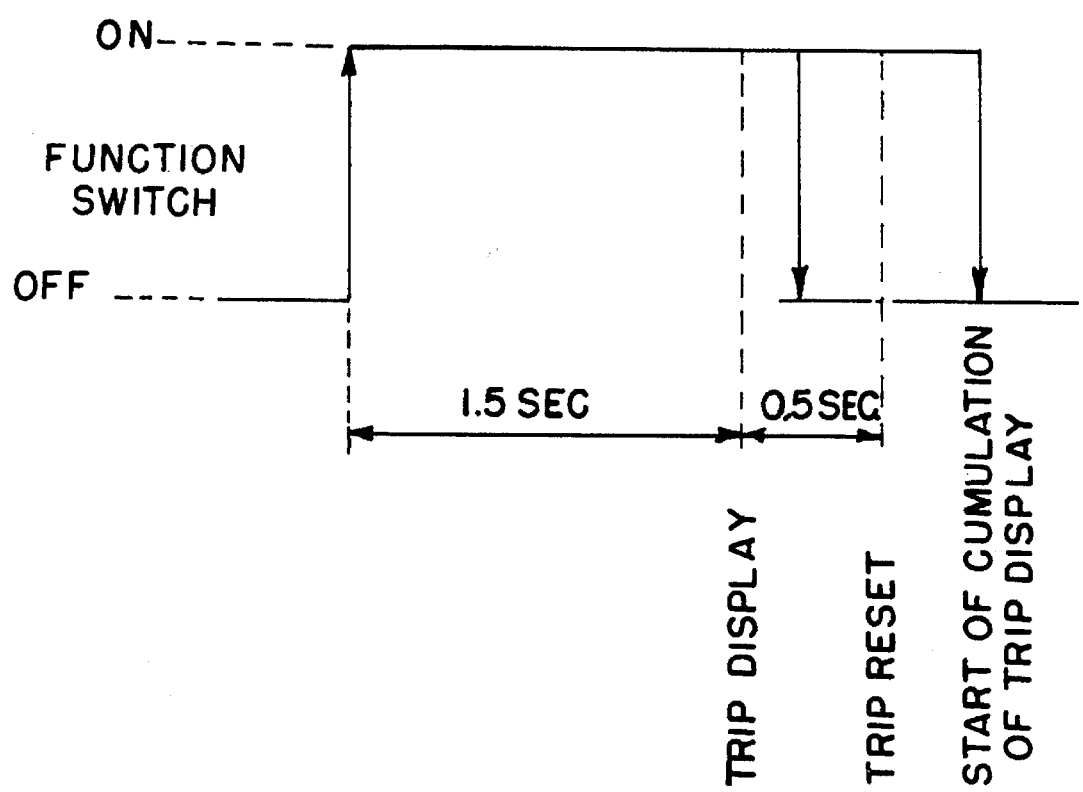
FIG. 33 is a schematic view illustrating the reset of the trip.

The reset of the trip is performed in the following procedure: Namely, as shown in FIG. 33, by pushing the function switch 408, the function switch 408 is turned ON and the trip value at present is displayed on the multi-display portion 410 after an elapse of 1.5 sec. When the function switch 408 is continuously turned ON, total: 2.0 sec., the trip value is reset to be 0 km, and the cumulation of the trip is started from the time when the function switch 408 is turned OFF. In addition, when the function switch 408 is turned OFF within the range of from 1.5 sec. to 2.0 sec., the trip value at present is displayed as it is.

The multi-display portion 410 has various alarm functions: "OIL" for the reduction in the oil amount; "CARD" for the fear of fallout of the key 424 from the controller main body 388 during running; "SPEED" for the car speed of 85 km/hr. or more; "OFF" for the turning OFF of the kill switch 476; "Err. 1" for the high input voltage of the control unit; "Err. 2" for the lock of the valve for the exhauster; and "Err. 3" for the abnormality of the throttle sensor 462.

For preventing the handle lock and the fallout of the key 424 during running, the control is performed on the basis of a flow chart shown in FIG. 34. First, the ON/OFF of the ON detection switch 474 is judged, step S20. When it is judged that the ON detection switch 474 is in the OFF state, the "LOCK" alarm is generated, step S21, and the solenoid 328 is turned ON, step S22. When the ON detection switch 474 is in the ON state, step S20, YES, the "LOCK" alarm is released and the solenoid 328 is turned OFF, steps S23 and S24.

Next, the process advances to the step S25, wherein the ON/OFF of the card insertion switch 472 is judged. When the card insertion switch 472 is in the ON state, the "CARD" alarm is released, step S26. When is in the OFF state, the process advances to the step S27, wherein it is judged whether or not the car speed is 1 km/hr. or more. When the card speed is 1 km/hr. or more, the "CARD" alarm is generated, step S28. On the other hand, when the car speed is less than 1 km/hr., the motorcycle is in the stopped state, and the trip and the total running distance are written in the EEPROM 452 and then the main relay 482 is turned OFF, steps S29 and 30.

When the vehicle reaches the desired location and the engine is intended to be in the stopped state, the operating lever 385 is manually rocked in the direction opposed to the direction of the arrow F in FIG. 11. The turning member 324 is thus pulled by the cable 372 and rotated in the direction of the arrow A against the spring member 325, see FIG. 13, so that the locking projection piece 378 is engaged with the second locking stepped portion 360 and the turning member 324 is in the OFF position, see FIG. 15B. As a result, the ignition circuit is turned OFF, to stop the engine.

In the above OFF position, the fixing of the stem pipe 318 is released. For fixing the handle 317, the operating lever 385 is further rocked in the direction opposed to the direction of the arrow F in such a state that the handle 317 is perfectly turned in a specified direction, for example, in the direction to the left, to rotate the turning member 324 in the direction of the arrow A by the cable 372, and the first locking stepped portion 358 is engaged with the locking projection portion 378, so that the stem pipe 318 is rigidly fixed by the locking member 322, see FIG. 15C.

According to the present invention, as described above, the engine key is inserted in the engine control unit for obtaining the locked state. This makes it impossible to start the engine by connecting the lead wire to the engine without the cylinder lock key as shown in the prior art. Namely, there is provided the key structure inserted in the rigid control box, wherein it can be electrically judged whether or not the key is correct with respect to the engine. In this case, the key insertion port is mounted on the portion not easily touched, thus making it possible to prevent the starting of the engine without the key from the outside, and to eliminate the special engine start preventive structure for the vehicular body as shown in the prior art.

Further, since the present invention does not adopt the special engine start preventive structure described above, it is possible to avoid an increase in the weight of the vehicle and an increase in the manufacturing cost. Additionally, since the cylinder lock key for the tank cap is integrated with the engine start key, it is possible to simplify the handling of the key.

The ejection of the card key is performed in association with the locking. Specifically, the ejection of the card key, the turning OFF of the power supply and the locking of the handle lock can be performed by the sequential action, which causes an advantage in further improving the operability.

Further, it is possible to eject the key in such a state that the operating member is shifted from the first position where the engine is in the ON state and to the second position where the engine is in the OFF state. When the operating member is shifted up to the third position, the locking position, the rotation of the handle itself can be restricted. In other words, it is possible to restrict the rotation of the handle without insertion of the key again after ejection of the key once, and hence to further make for an easy operation thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control apparatus for a vehicle having a body frame, a handle and an engine, the control apparatus comprising:
    an engine control unit provided on the body frame, said engine control unit including:
        an electric circuit for starting and stopping the engine and a slot for permitting entry to said electric circuit;
        a judgement unit electronically verifying whether or not a key inserted in said slot is correct with respect to said engine,
        whereupon proper electronic verification of said key operation of said engine in cooperation with said engine control unit is controlled; and
    a handle lock unit automatically unlocking the handle when said key inserted in said slot is verified by said judgement unit.

2. The control apparatus for a vehicle according to claim 1, wherein said key has a substantially flat shaped main body, and a different key member which is releasably inserted in said main body wherein said different key member is used for locking and unlocking vehicle equipment other than said engine control unit.

3. The control apparatus for a vehicle according to claim 1, wherein said handle lock unit includes an operating member and a handle rotation restricting member which is actuated by the operation of said operating member.

4. The control apparatus for a vehicle according to claim 1, wherein said key includes an IC card, and when said key is inserted in said slot, a recital signal stored in said IC card is supplied to said engine control unit; and wherein said judging unit verifies said key with respect to the engine based on the recital signal; and when said key is verified, the engine is placed in an operational state.

5. The control apparatus for a vehicle according to claim 3, wherein said handle rotation restricting member includes a rachet mechanism which is interlocked with said operating member for releasing said mechanism when the engine is in the operational state.

6. The control apparatus for a vehicle according to claim 3 wherein said handle rotation restricting member includes:
    a turning member which is rotated in one direction while being interlocked with said operating member for freely moving said handle rotation restricting member from a handle fixture releasing position to a handle fixing position; and
    a drive means for rotating said turning member in the other direction.

7. The control apparatus for a vehicle according to claim 5, wherein said operating member can be disposed at a first position where the operation of the engine is possible, a second position where the operation of the engine is impossible, and a third position where turning of the handle is prevented.

8. The control apparatus for a vehicle according to claim 7, wherein said operating member prevents ejection of said key from said slot at said first position, and permits the ejection of said key when the operating member is shifted from said second position to the third position.

9. The control apparatus for a vehicle according to claim 5, wherein said handle rotation restricting member is engaged with a shaft portion of the handle for restricting the rotation of the handle by shifting of said operating member from the second position to the third position, to prevent turning of the handle.

10. An engine enabling apparatus comprising:
    an operating lever connected to a first force transmitting member;
    a rachet mechanism receiving the first force transmitting member and including:
        a rachet housing having an opening for receiving the first force transmitting member;
        a rachet plate, connected to said first force transmitting member, slidable within said rachet housing and having a first contact connected to said rachet plate;
        a second contact disposed within said rachet housing;
        a solenoid having a plunger urged into engagement with said rachet plate by a plunger spring;
    wherein actuation of said solenoid disengages the plunger from said rachet plate and permits actuation of said operating lever; and
    wherein actuation of said operating lever causes said first force transmitting member to slide said rachet plate within said rachet housing so as to bring said first contact into contact with said second contact to thereby enable operation of the engine.

11. The engine enabling apparatus of claim 10, further comprising:
    an engine enabling circuit connected to said first contact and said second contact enabling the engine when said first contact contacts said second contact.

12. The engine enabling apparatus of claim 10, wherein said first force transmitting member is a wire disposed within a cable.

13. The engine enabling apparatus of claim 11, further comprising:
    a controller controlling an operation of the engine including a controller housing mounted to a frame of a vehicle, an opening in said controller housing, a key, insertable into the opening of said controller housing.

14. The engine enabling apparatus of claim 13, wherein said key includes a non-contact IC card and wherein said controller includes:

a read-out unit reading information from the non-contact IC card, a key verifier verifying an identity of said key based on the information read out from the non-contact IC card by said read-out unit.

15. The engine enabling apparatus of claim 13, wherein said key further includes:

a main key body having the non-contact IC card disposed therein, a detachable key member detachable from said main key body, a first lock plate, disposed within said main key body, locking said detachable key member into said main key body when said detachable key member is inserted into said main key body.

16. The engine enabling apparatus of claim 15, wherein said main key body includes a recessed portion and wherein said controller housing further includes a second lock plate engaging the recessed portion of said main key body when said key is inserted into the opening in said controller housing.

17. The engine enabling apparatus of claim 13, wherein said operating lever includes a key receiving portion for preventing said key from being removed from the opening in said controller housing when said operating lever is in an engine operating position.

18. The engine enabling apparatus of claim 13, further comprising:

a rachet plate spring urging said rachet plate toward a direction in which the first contact can contact the second contact.

19. The engine enabling apparatus of claim 18, wherein said controller further includes an engine start switch, wherein said solenoid is operated upon a first actuation of said engine start switch to disengage the plunger from said rachet plate, wherein the disengagement of the plunger from said rachet plate permits said rachet plate spring to slide said rachet plate so as to bring the first contact into contact with the second contact, and wherein contact between the first contact and the second contact permits said engine enabling circuit to enable operation of the engine.

20. The engine enabling apparatus of claim 19, wherein after the engine is enabled a second actuation of said engine start switch starts the engine.

21. The engine enabling apparatus of claim 18, wherein the engine can be disabled by moving said operating lever to an engine disabling position for causing the first force transmitting member to slide said rachet plate within said rachet housing such that the contact between the first contact and the second contact is broken wherein the broken contact disables operation of the engine.

22. The engine enabling apparatus of claim 21, wherein the broken contact shuts off said solenoid which allows the plunger spring to urge the plunger into engagement with said rachet plate.

23. The engine enabling apparatus of claim 10, wherein said engine enabling apparatus is disposed on a vehicle having a steering handle, a rotatable handle shaft, and a frame;

wherein said rachet mechanism further includes a second force transmitting member connected to said rachet plate through another opening in said rachet housing; and wherein said engine enabling apparatus further comprises a steering handle lock mechanism, connected to said second force transmitting member, locking the steering handle upon actuation of said second force transmitting member.

24. The engine enabling apparatus of claim 23, wherein the second force transmitting member is a wire disposed within a cable.

25. The engine enabling apparatus of claim 23, wherein said steering handle lock mechanism includes:

a steering handle lock housing fixed to the frame having a guide hole for receiving the second force transmitting member;

a sliding member, attached to the second force transmitting member, slidable within said steering handle lock housing between a first position and a second position and having a projection projecting through an open portion of said steering handle lock housing;

a claw member, fixed to the handle shaft, substantially capturing the projection in the first position to lock the steering handle and not capturing the projection in the second position to unlock the steering handle; and wherein operation of said operating lever causes the second force transmitting member to slide the projection between the first and second positions to lock and unlock the steering handle, respectively.

26. The engine enabling apparatus of claim 25, wherein said steering handle lock mechanism further includes:

a spring, disposed within said steering handle lock housing, biasing said sliding member towards the second position.

27. The engine enabling apparatus of claim 25, wherein said claw member is a substantially U-shaped member.

28. The engine enabling apparatus of claim 25, wherein said projection is substantially pin-shaped.

29. The engine enabling apparatus of claim 25, wherein said steering handle lock housing further includes a pair of parallel guides guiding said sliding member between the first position and the second position.

30. A steering handle locking apparatus for a vehicle having a steering handle, a rotatable handle shaft, and a frame comprising:

an operating lever connected to a force transmitting member;

a steering handle lock housing fixed to the frame having a guide hole for receiving the force transmitting member;

a sliding member, attached to the force transmitting member, slidable within said steering handle lock housing between a first position and a second position and having a projection projecting through an open portion of said steering handle lock housing;

a claw member, fixed to the handle shaft, substantially capturing the projection in the first position to lock the steering handle and not capturing the projection in the second position to unlock the steering handle; and wherein operation of said operating lever causes the force transmitting member to slide the projection between the first and second positions to lock and unlock the steering handle, respectively.

31. The steering handle locking apparatus of claim 30, and further comprising:

a spring, disposed within said housing, biasing said sliding member towards the second position.

32. The steering handle locking apparatus of claim 30, wherein said claw member is a substantially U-shaped member.

33. The steering handle locking apparatus of claim 30, wherein said projection is substantially pin-shaped.

34. The steering handle locking apparatus of claim 30, wherein said steering handle lock housing further includes a pair of parallel guides guiding said sliding member between the first position and the second position.

35. The steering handle locking apparatus of claim 30, wherein the force transmitting member is a wire disposed within a cable.

* * * * *